(12) United States Patent
Wakita

(10) Patent No.: US 9,559,555 B2
(45) Date of Patent: Jan. 31, 2017

(54) ROTOR AND MOTOR

(71) Applicant: MABUCHI MOTOR CO., LTD., Matsudo, Chiba (JP)

(72) Inventor: Tadayuki Wakita, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 0 days.

(21) Appl. No.: 14/805,184

(22) Filed: Jul. 21, 2015

(65) Prior Publication Data

US 2015/0326080 A1    Nov. 12, 2015

Related U.S. Application Data

(63) Continuation of application No. PCT/JP2014/000226, filed on Jan. 17, 2014.

(30) Foreign Application Priority Data

Jan. 31, 2013    (JP) .................................. 2013-017976

(51) Int. Cl.
*H02K 1/27* (2006.01)

(52) U.S. Cl.
CPC ......... *H02K 1/2773* (2013.01); *H02K 2201/03* (2013.01); *H02K 2213/03* (2013.01)

(58) Field of Classification Search
CPC .............. H02K 1/2773; H02K 2213/03; H02K 2201/03

See application file for complete search history.

(56) References Cited

U.S. PATENT DOCUMENTS

| 5,771,566 | A | | 6/1998 | Pop | |
|---|---|---|---|---|---|
| 5,990,592 | A | * | 11/1999 | Miura | ................ H02K 1/276 29/598 |
| 2004/0095033 | A1 | | 5/2004 | Popov | |
| 2014/0210294 | A1 | * | 7/2014 | Wakita | ............... H02K 1/2773 310/156.07 |

FOREIGN PATENT DOCUMENTS

| CN | 101165991 | 4/2008 |
|---|---|---|
| CN | 201608570 | 10/2010 |

(Continued)

OTHER PUBLICATIONS

International Search Report for PCT/JP2014/000226, dated Apr. 22, 2014, 4 pages.

(Continued)

*Primary Examiner* — Dang Le
(74) *Attorney, Agent, or Firm* — Schwabe, Williamson & Wyatt, P.C.

(57) ABSTRACT

A rotor includes: a circular rotor core; and a plurality of θ magnets. The θ magnets are contained in a magnet holding sections such that the same magnetic pole of one magnet as that of another magnet adjacent to said one magnet faces the same magnet pole of the adjacent magnet in circumferential directions of the rotor core. Given that the number of magnetic poles of the rotor is denoted by P, the maximum outside diameter of the rotor core is denoted by Dr [mm], and the thickness of the plate-like magnet in a circumferential direction of the rotor core is denoted by Lm [mm], the following inequality (2) is satisfied:

$0.665 \times 10^{-4} \times P^2 - 0.28 \times 10^{-2} \times P + 0.577 \times 10^{-1} < (Lm/Dr)$
$< 3.38 \times 10^{-4} \times P^2 - 1.86 \times 10^{-2} \times P + 3.36 \times 10^{-1}$    (2).

9 Claims, 22 Drawing Sheets

(56) References Cited

FOREIGN PATENT DOCUMENTS

| EP | 0449538 | 10/1991 |
|---|---|---|
| EP | 0803962 A1 | 10/1997 |
| EP | 0901214 | 10/1999 |
| EP | 2395635 A1 | 12/2011 |
| JP | H06245419 A | 9/1994 |
| JP | H09294344 A | 11/1997 |
| JP | 2005539474 A | 12/2005 |
| JP | 2008011692 A | 1/2008 |
| JP | 2012517209 A | 7/2012 |
| JP | 2012165576 A | 8/2012 |

OTHER PUBLICATIONS

International Preliminary Report on Patentability in Japanese for PCT/JP2014/000226, dated Aug. 4, 2015, 5 pages.
International Preliminary Report on Patentability with English translation for PCT/JP2014/000226, dated Aug. 4, 2015, 6 pages.
European Search Report for EP 14745394.8, dated Oct. 7, 2016, 9 pages.

* cited by examiner

12

12

| | | NUMBER OF MAGNETIC POLES | | | | |
|---|---|---|---|---|---|---|
| | | P=8 | P=12 | P=16 | P=20 | P=24 |
| THICKNESS OF θ MAGNET/ ROTOR CORE MAXIMUM OUTSIDE DIAMETER (Lm/Dr) | 2% | | | | | |
| | 4% | | | | | |
| | 6% | | | | | |
| | 8% | | | | | |
| | 10% | | | | | |

44

46

48

52

110

120

130

ROTOR AND MOTOR

CROSS-REFERENCE TO RELATED APPLICATIONS

This application is based upon and claims the benefit of priority from the prior Japanese Patent Application No. 2013-017976, filed on Jan. 31, 2013, and International Patent Application No. PCT/JP 2014/000226, filed on Jan. 17, 2014, the entire content of each of which is incorporated herein by reference.

BACKGROUND OF THE INVENTION

1. Field of the Invention

The present invention relates to a rotor and a motor.

2. Description of the Related Art

In the conventional practice, motors are used as driving sources of various types of apparatuses and products. For example, the motors are used for business machines, such as printers and copying machines, various kinds of home electric appliances, and power assist sources of vehicles, such as automobiles and power-assisted bicycles. In particular, brushless motors are sometimes used as the driving sources of movable parts with high operation frequency in the light of increased durability and reduced noise.

Known as a type of such a brushless motor is an interior permanent magnet (IPM) motor where a permanent magnet is embedded in a rotor. For example, there is an electric motor in which a plurality of plate-like magnets are radially embedded in a rotor yoke and also each magnet is disposed such that the same poles of adjacent magnets face each other circumferentially (see Japanese Patent 3425176).

While it is an idea to use a magnet with high residual magnetic flux density in order to improve the average magnetic flux density in an outer circumferential part of the motor's rotor yoke, it can disadvantageously lead to an increase in the cost.

SUMMARY OF THE INVENTION

The present invention has been made in view of the foregoing circumstances, and a purpose thereof is to provide a technology by which to increase an average magnetic flux density in an outer circumferential part of the rotor.

A rotor according to one embodiment of the invention includes: a circular rotor core; and a plurality of plate-like magnets. The rotor core has a plurality of magnet holding sections formed radially around a rotating shaft. The plate-like magnets are contained in the magnet holding sections such that the same magnetic pole of one magnet as that of another magnet adjacent to said one magnet faces the same magnet pole of the adjacent magnet in circumferential directions of the rotor core. Given that the number of magnetic poles of the rotor is denoted by P, the maximum outside diameter of the rotor core is denoted by Dr [mm], and the thickness of the plate-like magnet in a circumferential direction of the rotor core is denoted by Lm [mm], the following inequality (2) is satisfied:

$$0.665 \times 10^{-4} \times P^2 - 0.28 \times 10^{-2} \times P + 0.577 \times 10^{-1} < (Lm/Dr) < 3.38 \times 10^{-4} \times P^2 - 1.86 \times 10^{-2} \times P + 3.36 \times 10^{-1} \quad (2).$$

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
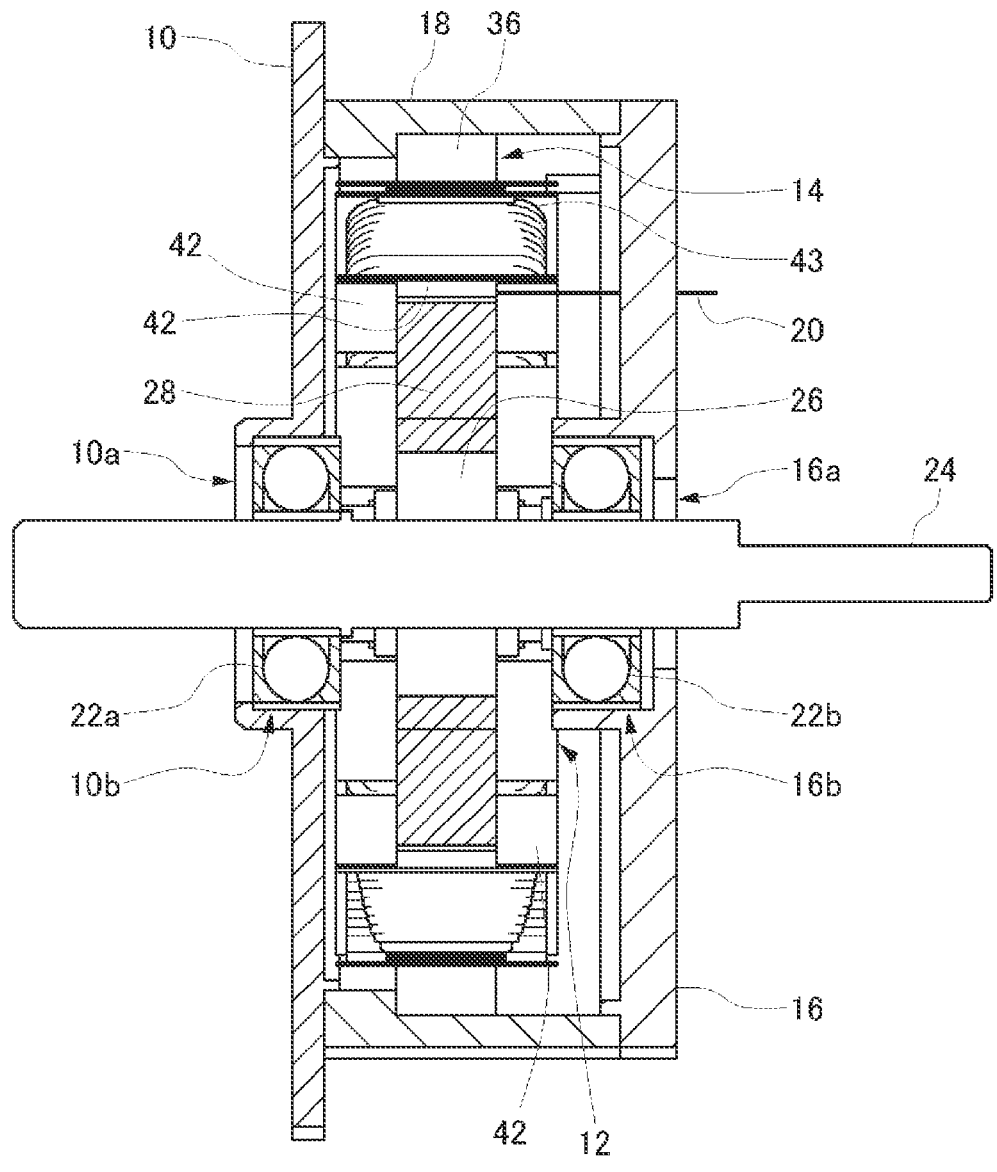
FIG. 1 is a cross-sectional view of a brushless motor according to a first embodiment.

A rotor according to one embodiment of the invention includes: a circular rotor core; and a plurality of plate-like magnets. The rotor core has a plurality of magnet holding sections formed radially around a rotating shaft. The plate-like magnets are contained in the magnet holding sections such that the same magnetic pole of one magnet as that of another magnet adjacent to said one magnet faces the same magnet pole of the adjacent magnet in circumferential directions of the rotor core. Given that the surface area of a surface of the plate-like magnet having a magnetic pole is denoted by $S_1$ [mm$^2$], the surface area of an outer circumferential surface of the rotor core is denoted by $S_2$ [mm$^2$], the number of magnetic poles of the rotor is denoted by P, the maximum outside diameter of the rotor core is denoted by Dr [mm], and the thickness of the plate-like magnet in a circumferential direction of the rotor core is denoted by Lm [mm], the following inequalities (1) and (2) are satisfied:

$$S_1 > S_2/P \quad (1);$$

$$0.665 \times 10^{-4} \times P^2 - 0.28 \times 10^{-2} \times P + 0.577 \times 10^{-1} < (Lm/Dr) < 3.38 \times 10^{-4} \times P^2 - 1.86 \times 10^{-2} \times P + 3.36 \times 10^{-1} \quad (2).$$

According to the embodiment, the surface area $S_2/P$ of the rotor core outer circumferential surface for each magnet is smaller than the surface area $S_1$ of the surface of the plate-like magnet having a magnetic pole. In other words, because the lines of magnetic force emanating from the surface having a magnetic pole passes through the outer circumferential part of the rotor, which is a narrower region than the surface, the average magnetic flux density at a gap between the rotor and the stator can be larger than or equal to the residual magnetic flux density of the magnet. By selecting the number of magnetic poles of the rotor, the maximum outside diameter of the rotor core, and the average thickness of the plate-like magnet so as to meet the above inequality (2), the average magnetic flux density of the rotor can be further increased.

The rotor core may be a laminate of a plurality of electromagnetic steel sheets or cold-rolled steel sheets, and, given that the thickness of a single electromagnetic steel sheet or cold-rolled steel sheet is denoted by T [mm], and the shortest distance between the adjacent plate-like magnets is denoted by Wb [mm], the following inequality (3) may be satisfied:

$$Wb \leq 5T \quad (3).$$

If the shortest distance between the adjacent magnets is large, valid magnetic fluxes will tend to drop due to magnetic short-circuiting in the yoke core. The drop in the valid magnetic fluxes (i.e., the average magnetic flux density in the outer circumferential part of the rotor) can be suppressed when the shortest distance Wb between the magnets is so designed as to satisfy the inequality (3).

The magnet holding section may have radial relief parts formed in a radial direction of the rotor core and in a center-side end of the rotor core, the radial relief parts forming gaps when the plate-like magnet is contained in and held by the magnet holding section. The radial relief parts may be provided such that they extend toward the center of the rotor core from a center-side end face of the rotor core of the plate-like magnet contained in the magnet holding section. This improves the operability when the plate-like magnets are to be inserted into the magnet holding sections. This also suppresses the occurrence, inside the rotor core, of short-circuiting (magnetic short-circuiting) of magnetic flux emanating from each magnet. Since the radial relief parts extend toward the center of the rotor core, the shortest distance between plate-like magnets can be reduced.

The magnet holding section may have circumferential relief parts formed in a radial direction of the rotor core and in a center-side end of the rotor core, the radial relief parts forming gaps when the plate-like magnet is contained in and held by the magnet holding section. The circumferential relief parts may be provided such that they extend toward the center of the rotor core from a center-side end face of the rotor core of the plate-like magnet contained in the magnet holding section. This improves the operability when the plate-like magnets are to be inserted into the magnet holding sections. This also suppresses the occurrence, inside the rotor core, of short-circuiting (magnetic short-circuiting) of magnetic flux emanating from each magnet.

The number P of magnetic poles of the rotor may be any one of 12 poles, 14 poles, 16 poles, 18 poles and 20 poles. This can further increase the average magnetic flux density.

The thickness Lm of the plate-like magnet in the circumferential directions of the rotor core may be 1 mm to 25 mm.

The maximum outside diameter Dr of the rotor core may be 35 mm to 200 mm.

Another embodiment of the invention relates to a motor. The motor includes: a cylindrical stator where a plurality of winding wires are placed; the aforementioned rotor provided in a center of the stator; and a power feed section configured to supply power to the plurality of winding wires of the stator.

By employing this embodiment, the average magnetic flux density in the outer circumferential part of the rotor can be increased, thereby contributing to the improvement of the motor torque.

Optional combinations of the aforementioned constituting elements, and implementations of the invention in the form of methods, apparatuses, and systems may also be practiced as additional modes of the present invention.

According to the present invention, the average magnetic flux density in an outer circumferential part of the rotor provided in a motor is increased.

A description will be given of embodiments of the present invention with reference to the drawings. Like numerals represent like elements so that the description will be omitted accordingly. The structures described hereinbelow are only exemplary and does not limit the scope of the present invention. A description is given hereunder using a brushless motor of an inner rotor type as an example.

First Embodiment

[Brushless Motor]

FIG. 1 is a cross-sectional view of a brushless motor according to a first embodiment. A brushless motor (hereinafter referred to as "motor" also) 100 according to the first embodiment includes a front bell 10, a rotor 12, a stator 14, an end bell 16, a housing 18, and a power feed section 20.

The front bell 10, which is a plate-shaped member, not only has a hole 10a formed in a central part so that a rotating shaft 24 can penetrate therethrough, but also has a recess 10b, which holds a bearing 22a, formed near the hole 10a. The end bell 16, which is a plate-shaped member, not only has a hole 16a formed in a central part so that the rotating shaft 24 can penetrate therethrough, but also has a recess 16b, which holds a bearing 22b, formed near the hole 16a. The housing 18 is a cylindrical member. The front bell 10, the end bell 16 and the housing 18 constitute a casing of a motor 100.

[Rotor]

Figure 2:
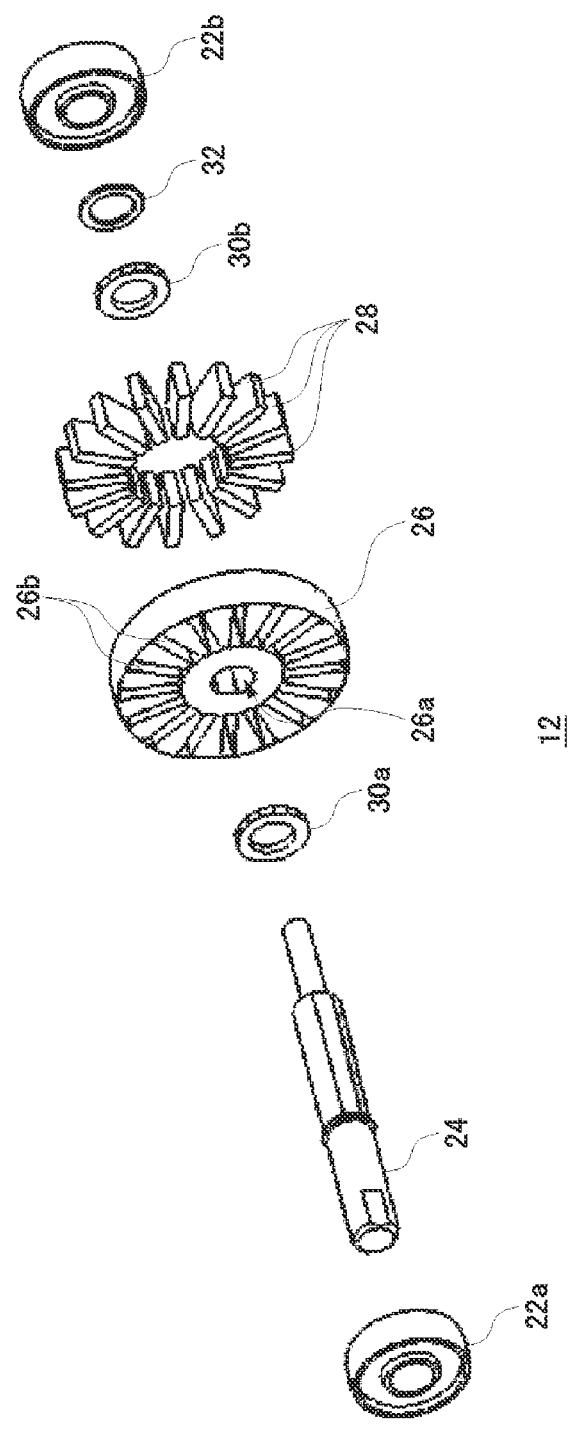
FIG. 2 is an exploded perspective view of a rotor according to the first embodiment.
Figure 3A:
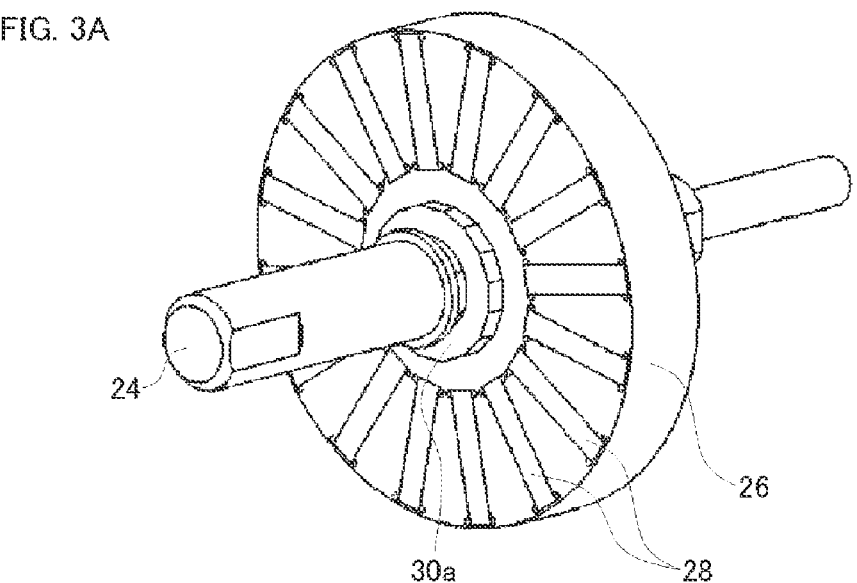
FIG. 3A is a perspective view of the rotor with each member, excluding a bearing, mounted to the rotating shaft.
Figure 3B:
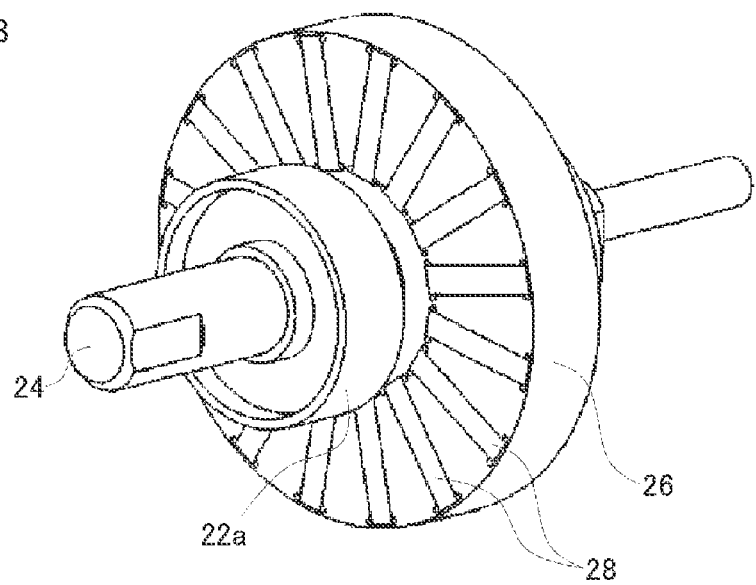
FIG. 3B is a perspective view of the rotor with each member, including the bearing, mounted to the rotating shaft.

FIG. 2 is an exploded perspective view of a rotor according to the first embodiment. FIG. 3A is a perspective view of the rotor with each member, excluding a bearing, mounted to the rotating shaft 24. FIG. 3B is a perspective view of the rotor with each member, including the bearing, mounted to the rotating shaft 24.

The rotor 12 is comprised of a circular rotor core 26 and a plurality of θ magnets 28. A through-hole 26a, which is fixed with the rotating shaft 24 inserted thereinto, is formed in a center of the rotor core 26. Also, the rotor core 26 has a plurality of magnet holding sections 26b that are fixed by inserting the θ magnets 28 thereinto. The θ magnets 28 are of plate-shaped members in accordance with the shape of the magnet holding sections 26b.

Then, each member is assembled in sequence. More specifically, a plurality (i.e., sixteen) of θ magnets 28 are fitted into the corresponding magnet holding sections 26b, and the rotating shaft 24 is inserted into the through-hole 26a of the rotor core 26. Then the bearing 22a is mounted to the rotating shaft 24 by way of a spacer 30a. Also, the bearing 22b is mounted to the rotating shaft 24 by way of a spacer 30b and a spacer 32 for bearing.

[Rotor Core]

Figure 4A:
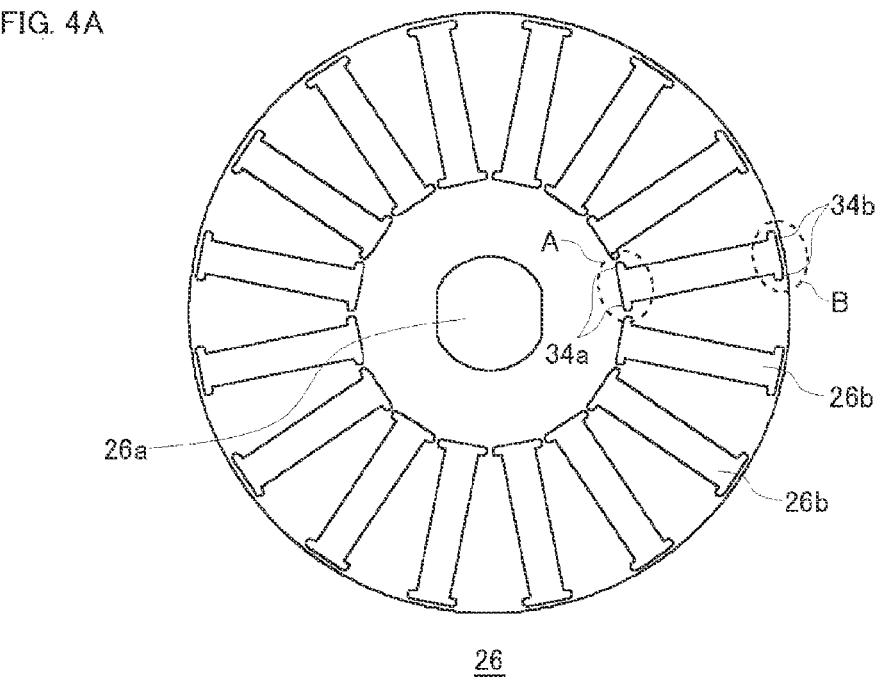
FIG. 4A is a top view of the rotor core according to the first embodiment.
Figure 4B:
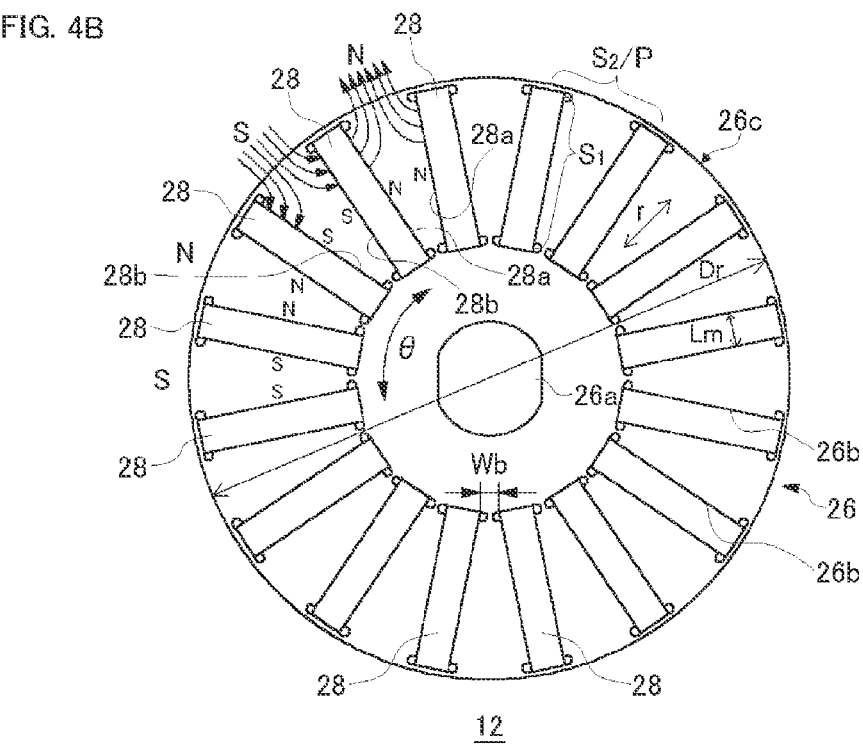
FIG. 4B is a top view showing a state where the θ magnets are fitted into the rotor core shown in FIG. 4A.

FIG. 4A is a top view of the rotor core 26 according to the first embodiment. FIG. 4B is a top view showing a state where the θ magnets 28 are fitted into the rotor core 26 shown in FIG. 4A. In the rotor core 26, a plurality of plate-shaped members are laminated. Each of the plurality of plate-shaped members is manufactured such that a non-oriented electromagnetic steel sheet (e.g., silicon steel sheet) is stamped out into a predetermined shape, as shown in FIG. 4A, by press-forming. Then the magnet holding sections 26b are radially formed with the rotating shaft of the rotor core 26 as the center.

As shown in FIG. 4B, the θ magnets 28 are contained in the magnet holding sections 26b such that the same magnetic pole of one θ magnet 28 as that of another θ magnet 28 adjacent to said one θ magnet 28 faces the same magnet pole of the adjacent θ magnet 28 in circumferential directions θ of the rotor core 26. In other words, the θ magnets 28 are configured such that principal surfaces 28a and 28b, whose surface areas are largest among the six surfaces of each of the adjacent θ magnets 28 that are each an approximately rectangular parallelepiped, are an N-pole and an S-pole, respectively. Thus, the lines of magnetic force emanating from the principal surface 28a of the θ magnet 28 are directed outward of the rotor core 26 from a region disposed between these two adjacent θ magnets 28. As a result, the rotor 12 according to the present embodiment functions as sixteen magnets such that eight N-poles and eight S-poles are alternately formed in a circumferential direction of an outer circumferential surface of the rotor 12.

The θ magnet 28 is a bonded magnet, a sintered magnet or the like, for instance. The bonded magnet is a magnet formed such that a ferromagnetic material is kneaded with a rubber or resin material and then the ferromagnetic material kneaded with such a material undergoes injection molding or compression molding. Where the bonded magnet is used, a high-precision C face (inclined plane) or R face is obtained without having to undergo any postprocessing. On the other hand, the sintered magnet is a magnet formed such that powered ferromagnetic materials are sintered at high temperature. The sintered magnet is more likely to improve the residual magnetic flux density than the bonded magnet is. However, in order to have a high-precision C face or R face, the postprocessing is often required.

The rotor 12 according to the present embodiment is designed to meet the following relation in order to improve the average magnetic flux density in an outer circumferential part of the rotor 12. More specifically, the surface area of the principal surface 28a (28b) having a magnetic pole of the θ magnet 28 is denoted by $S_1$ [mm$^2$], the surface area of an outer circumferential surface 26c of the rotor core 26 is denoted by $S_2$ [mm$^2$], and the number P of magnetic poles of the rotor 12 (e.g., 16 poles in the present embodiment) is denoted by P. Then the rotor 12 is so configured as to meet the condition that is expressed by $S_1 > S_2/P$.

In such a case, the surface area $S_2/P$ of the outer circumferential surface 26c for each θ magnet is smaller than the surface area $S_1$ of the principal surface 28a (28b) of the θ magnet 28 having a magnetic pole. That is, the lines of magnetic force emanating from the principal surface 28a (28b) of one θ magnet 28 having a magnetic pole is directed outward from a partial region of the outer circumferential surface of the rotor 12 (the partial region thereof being denoted by $S_2/P$), which is a narrower region than the principal surface 28a (28b) thereof. Thereby, it is possible to set the average magnetic flux density at a gap between the rotor 12 and the stator 14 larger than or equal to the residual magnetic flux density of the θ magnet 28. As a result, the average magnetic flux density in the outer circumferential part of the rotor 12 can be improved.

A further detailed description is now given of the magnet holding section 26b. As shown in FIG. 4A, circumferential relief parts 34a and 34b are formed in both ends of the rotor core 26 in a radial direction of the rotor. Here, the circumferential relief parts 34a and 34b form gaps when the θ magnet 28 is contained in and held by the magnet holding section 26b.

Figure 5A:
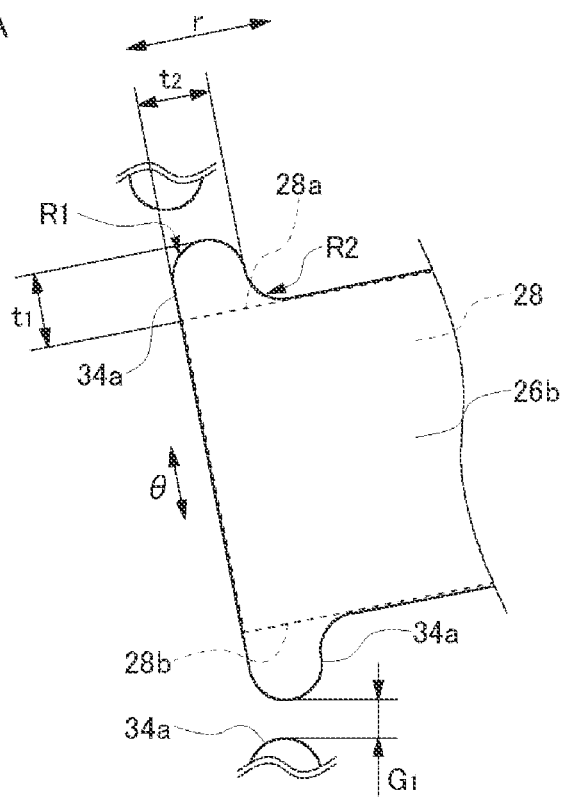
FIG. 5A is an enlarged view of region A in FIG. 4A.
Figure 5B:
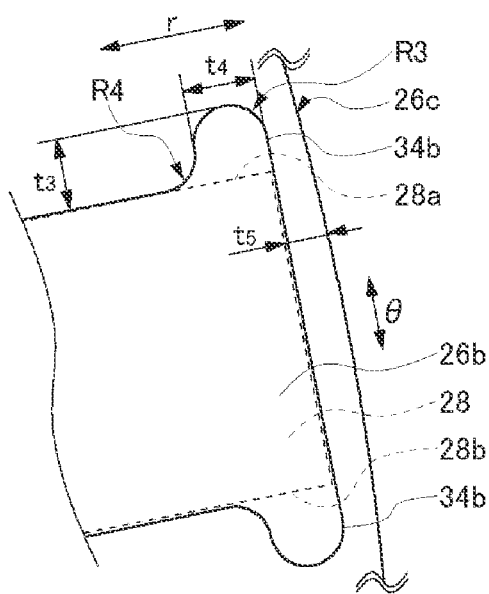
FIG. 5B is an enlarged view of region B in FIG. 4A.

FIG. 5A is an enlarged view of region A in FIG. 4A. FIG. 5B is an enlarged view of region B in FIG. 4A.

As shown in FIG. 5A, the magnet holding section 26b has the circumferential relief parts 34a formed in a radial direction of the rotor core 26 and in a center-side end of the rotor core 26. The circumferential relief parts 34a form gaps when the θ magnet 28 is contained in and held by the magnet holding section 26b. The circumferential relief parts 34a are provided such that they extend toward the circumferential directions θ of the rotor core 26 from the principal surfaces 28a and 28b having magnetic poles of the θ magnet 28 contained in the magnet holding section 26b.

Given that the thickness of a single electromagnetic steel sheet or cold-rolled steel sheet that constitutes the rotor core 26 is denoted by T [mm], the dimensions of the circumferential relief part 34a are so set as to satisfy the following inequalities. That is, the thickness $t_1$ of the circumferential relief part 34a in the circumferential directions θ is set such that $t_1 \leq 3T$ and more preferably $t_1 \leq 2T$, and the thickness $t_2$ thereof in a radial direction r is set such that $t_2 \leq 3T$ and more preferably $t_2 \leq 2T$. Also, the diameters of an R1 face and an R2 face of the circumferential relief part 34a are each less than or equal to 1.5 T and more preferably less than or equal to 1.0 T. Also, an interval G1 between adjacent circumferential relief parts 34a is about 1.0 T.

Also, the magnet holding section 26b has the circumferential relief parts 34b formed in a radial direction of the rotor core 26 and in an end opposite to the center side of the rotor core 26. The circumferential relief parts 34b form gaps when the θ magnet 28 is contained in and held by the magnet holding section 26b. The circumferential relief parts 34b are provided such that they extend toward the circumferential directions θ of the rotor core 26 from the principal surfaces 28a and 28b having magnetic poles of the θ magnet 28 contained in the magnet holding section 26b.

The dimensions of the circumferential relief part 34b are so set as to satisfy the following inequalities. That is, the thickness $t_3$ of the circumferential relief part 34b in the circumferential directions θ is set such that $t_3 \leq 3T$ and more preferably $t_3 \leq 2T$, and the thickness $t_4$ thereof in a radial direction r is set such that $t_4 \leq 3T$ and more preferably $t_4 \leq 2T$. Also, the diameters of an R3 face and an R4 face of the circumferential relief part 34b are each less than or equal to 1.5 T and more preferably less than or equal to 1.0 T. The thickness $t_5$ between the circumferential relief part 34b and the outer circumferential surface 26c of the rotor core 26 is about 1.0 T. Also, the rigidity of the rotor core 26 can be enhanced by making the outer circumferential surface 26c into a circular continuous surface.

Since the magnet holding section 26b has the circumferential relief parts 34a and the circumferential relief parts 34b, the interference of corners (edge portions) of the θ magnet 28 with the magnet holding section 26b, which may otherwise occur when the θ magnets 28 are inserted to the rotor core 26, is suppressed. Accordingly, the degree of freedom in the shape of the θ magnets 28, particularly the shape of the corners, increases, thereby improving the operability when the θ magnets 28 are to be inserted into the magnet holding sections 26b even though the θ magnets 28 have no R faces or C faces. Also, invalid magnetic fluxes, heading toward the opposite principal surface 28b passing through within the rotor core 26, among the fluxes emanating from the principal surface 28a of each θ magnet 28 are blocked by the circumferential relief parts 34a and 34b, which are filled with air whose relative magnetic permeability is low. Hence, the occurrence of short-circuiting (magnetic short-circuiting) inside the rotor core 26 is suppressed.

At the same time, parts of the principal surfaces 28a and 28b having the magnetic poles of the θ magnet 28 do not come in contact with the rotor core 26 because of the circumferential relief parts 34a and 34b. As a result, it is possible that valid magnetic fluxes, which leave the principal surface 28a of the θ magnet 28 and then enter the principal surface 28b by way of the gap, will be reduced. However, a sintered magnet having a high residual magnetic flux density can be used as the θ magnet 28 even though the magnet does not have the C face (inclined plane) or R face in the corner. Thus, a desired average magnetic flux density for the rotor 12 can be achieved.

Given that the shortest distance between the adjacent θ magnets 28 is denoted by Wb [mm] (see FIG. 4B), Wb is so set as to satisfy $Wb \leq 7T$ and more preferably $Wb \leq 5T$. If the shortest distance between the adjacent θ magnets 28 is large, the invalid magnetic fluxes inside the rotor core 26 resulting from the magnetic short-circuiting will increase and therefore valid magnetic fluxes at the gap between the rotor 12 and the stator 14 will tend to drop. In the light of this, the drop in the valid magnetic fluxes (i.e., the average magnetic flux density in the outer circumferential part of the rotor 12) can be suppressed when the shortest distance Wb between the adjacent magnets is so designed as to satisfy the aforementioned inequalities.

[Stator]

Figure 6:
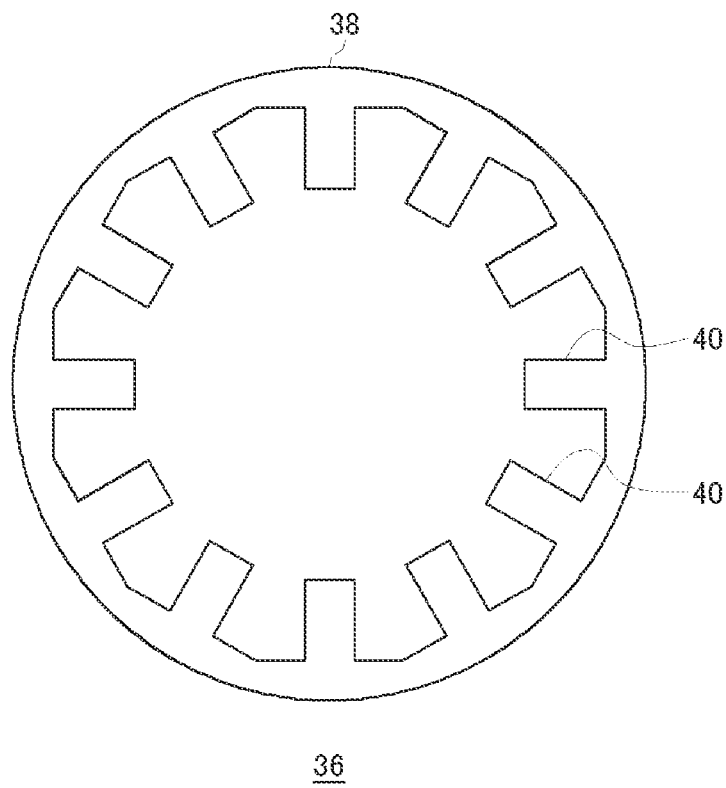
FIG. 6 is a top view of a stator core.
Figure 7:
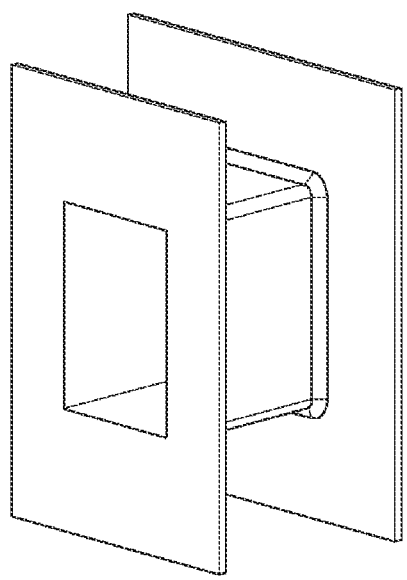
FIG. 7 is a perspective view of an insulator around which a winding is wound.
Figure 8A:
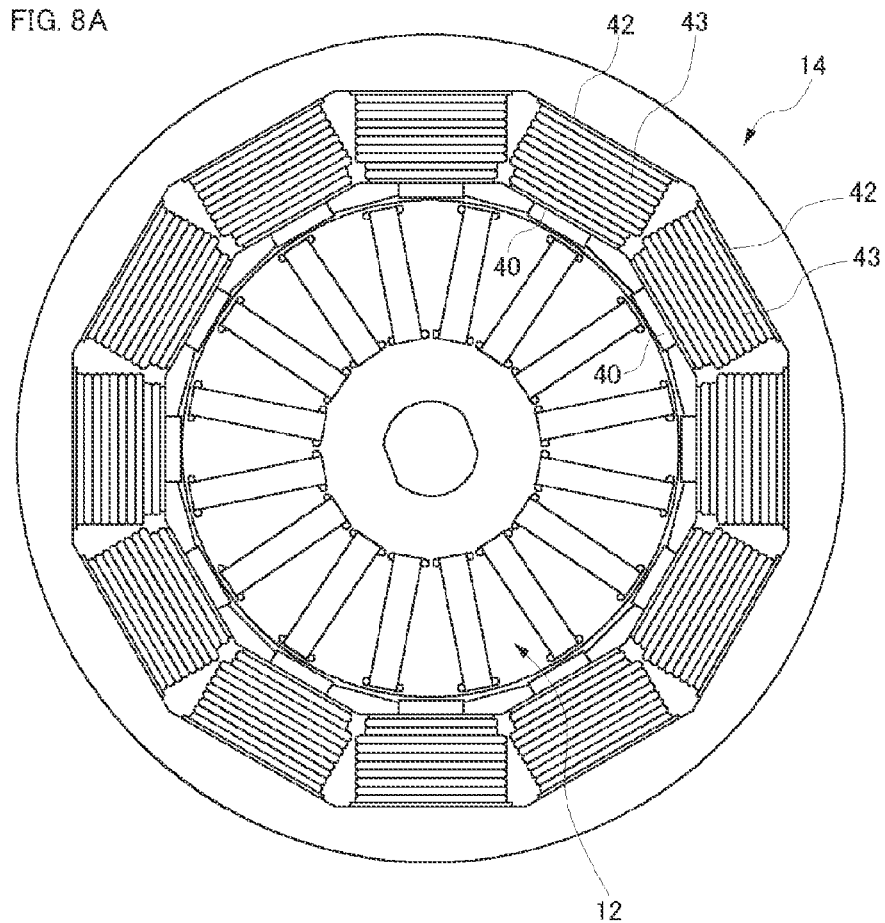
FIG. 8A is a top view of a stator and a rotor according to the embodiment.
Figure 8B:
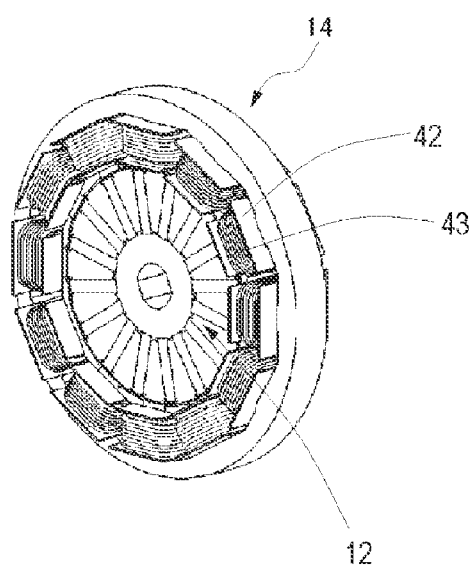
FIG. 8B is a perspective view of the stator and the rotor according to the embodiment.

A structure of the stator 14 is now described. FIG. 6 is a top view of a stator core. FIG. 7 is a perspective view of an insulator around which a winding is wound. FIG. 8A is a top view of a stator and a rotor according to the embodiment. FIG. 8B is a perspective view of the stator and the rotor according to the embodiment.

A stator core 36 is a cylindrical member in which a plurality of plate-like stator yokes 38 are laminated. The stator yoke 38 is configured such that a plurality (e.g., twelve in the present embodiment) of teeth 40 are formed from an inner circumference of a circular portion (annular portion) toward a center.

An integrated-type insulator 42 as shown in FIG. 7 is attached to each of the teeth 40. Then, a conductor is wound around the insulator 42 for each of the teeth 40 so as to form a stator winding 43. Then, as shown in FIGS. 8A and 8B, the rotor 12 is placed in a central part of the stator 14 that has been completed through the above processes. If the tooth 40 is configured such that the width of the tooth 40 gets wider toward the tip thereof, a plurality of divided insulators may be attached from top and bottom of the teeth 40.

[The Number of θ Magnets and the Shape Thereof]

When an IPM brushless motor of an inner rotor type like the motor 100 according to the present embodiment is used, the number of θ magnets 28 and the shape thereof can be selected in a way depending on the size of the rotor core 26. Meanwhile, randomly selecting the number of θ magnets 28 and the shape thereof only does not achieve a highly efficient (e.g., high torque) motor.

In the light of this, the inventor of the present invention has come to recognize the following point through diligent investigations. That is, optimizing the number of θ magnets 28 (i.e., the number P of magnetic poles of the rotor 12) and the thickness Lm (mm) of the θ magnets 28 in a circumferential direction of the rotor core 26, relative to the diameter Dr [mm] of the rotor core 26, can improve an average magnetic flux density Bg in the outer circumferential part of the rotor 12 relative to a residual magnetic flux density Br of the θ magnets 28.

Figure 9:
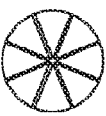
FIG. 9 schematically lists the arrangements of magnets of a rotor corresponding to the number P of magnetic poles and the ratio (Lm/Dr) of the thickness (Lm[mm]) of the θ magnet over the maximum outside diameter (Dr[mm]) of a rotor core.

A description is given hereunder of analysis results obtained in simulation runs and the like. FIG. 9 schematically lists the arrangements of magnets of a rotor corresponding to the number P of magnetic poles and the ratio (Lm/Dr) of the thickness (Lm[mm]) of the θ magnet over the maximum outside diameter (Dr[mm]) of a rotor core. If the shape of the rotor core is a true circle, the diameter and the maximum outside diameter are identical. Assume that the θ magnets 28 are arranged in the rotor core 26 of a predetermined size. Then, as shown in FIG. 9, the larger the number of θ magnets 28 (the number P of magnetic poles thereof) is, the less the length of the θ magnet 28 in a radial direction of the rotor core becomes in order to avoid the interference between the adjacent θ magnets 28. That is, the area of a principal surface of the θ magnet 28 having a magnetic pole thereof becomes smaller.

For the same number of magnetic poles, as shown in FIG. 9, the greater the thickness Lm of the θ magnet 28 in a radial direction of the rotor core is, the less the length of the θ magnet 28 in a circumferential direction of the rotor core becomes in order to avoid the interference between the adjacent θ magnets 28. That is, the area of a principal surface of the θ magnet 28 having a magnetic pole thereof becomes smaller.

Thus, the inventor of the present invention had analyzed how the magnetic flux density in the outer circumferential part of each rotor configured as shown in FIG. 9 (i.e., in a gap between a rotor and a stator) varies with the change in the number P of magnetic poles and the ratio (Lm/Dr) of the thickness Lm of a θ magnet to the maximum outside diameter Dr of a rotor core. More specifically, analysis is conducted for the cases where the numbers P of magnetic poles are 8, 12, 16, 20 and 24 and the ratio (Lm/Dr) of the thickness Lm of the θ magnet to the maximum outside diameter Dr of the rotor core varies in a range of 2% to 24%.

Figure 10:
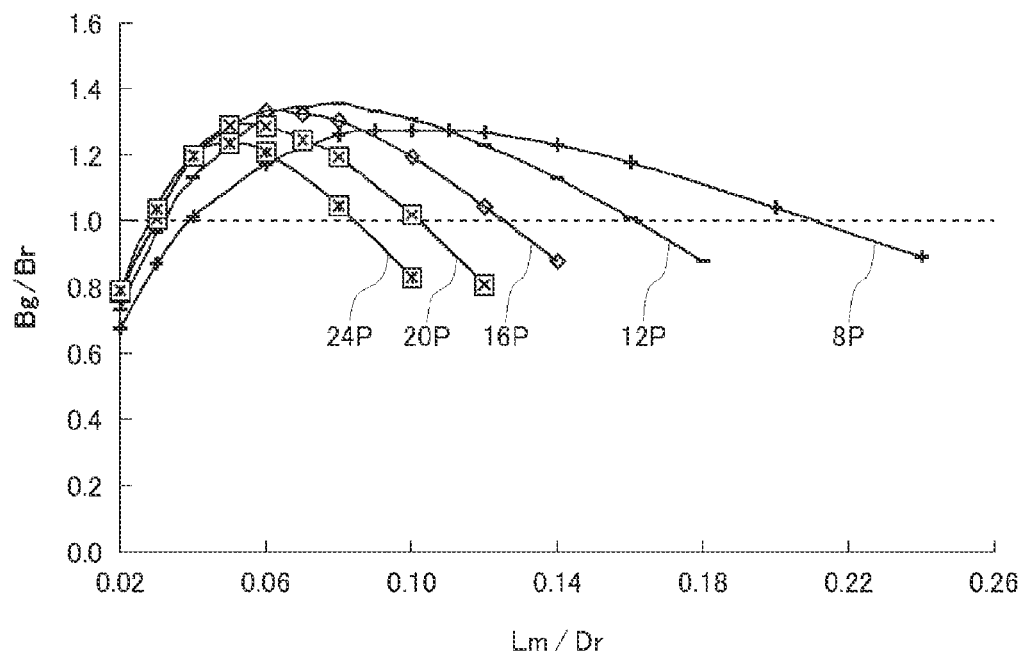
FIG. 10 is a graph showing a relation, for each of the number of magnetic poles, between the ratio (Lm/Dr) of the thickness Lm of a θ magnet to the maximum outside diameter Dr of a rotor core and the average magnetic flux density Bg in said gap.

FIG. 10 is a graph showing a relation, for each of the number of magnetic poles, between the ratio (Lm/Dr) of the thickness Lm of a θ magnet to the maximum outside diameter Dr of a rotor core and the average magnetic flux density Bg in said gap. In the vertical axis of FIG. 10, the magnetic flux density in said gap is normalized by dividing it by the residual magnetic flux density Br of the θ magnet. Also, the residual magnetic flux density Br of the θ magnet used in the analysis is set to 1 [T], and the width of said gap is 1% of the maximum outside diameter Dr of the rotor core.

As evident from FIG. 10, for any given number P of magnetic poles, as the value of Lm/Dr increases from 2%, the value of Bg/Br increases, too; thereafter, the value of Bg/Br reaches a peak value; and, thereafter, as the value of Lm/Dr further increases passing the peak value, the value of Bg/Br goes into decline. This is considered attributable to the following reason. As listed in FIG. 9, for the same number of magnetic poles, as the thickness Lm of the θ magnet increases, the length thereof in a radial direction of the rotor core must be reduced in order to avoid the interference between the θ magnets 28. As a result, the area of a principal surface of the θ magnet having a magnetic pole thereof is reduced.

It is verified from the above analysis results that, in a range for which Bg/Br>1.0, the average magnetic flux density Bg in the gap between the rotor and the stator is higher than the residual magnetic flux density Br of the θ magnet and therefore the value of Lm/Dr is preferably in its range for which Bg/Br>1.0 holds.

Figure 11:
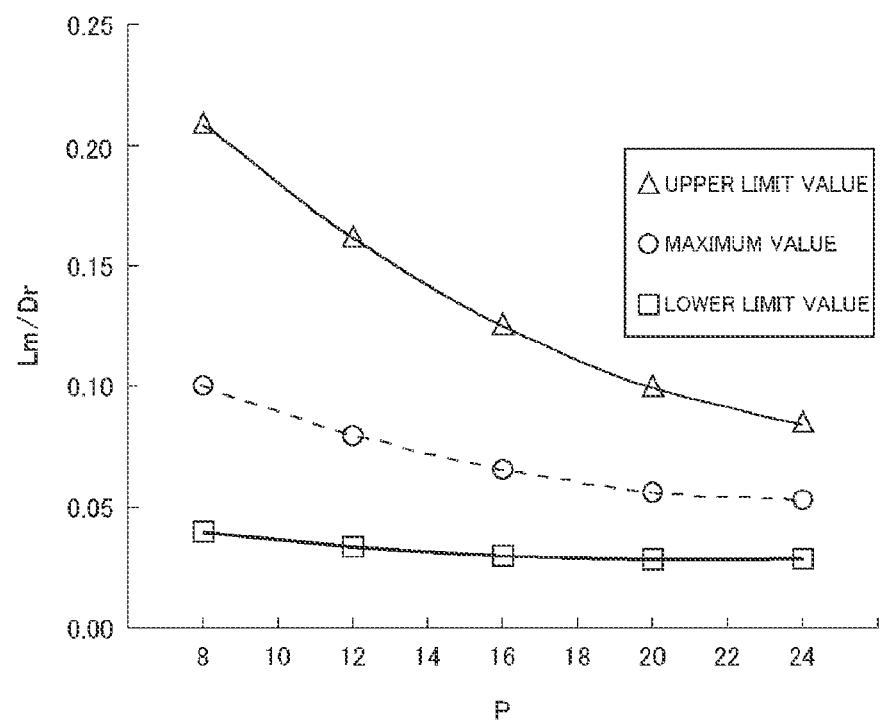
FIG. 11 is a graph showing a relation between the number P of magnetic poles and the ratio (Lm/Dr) of the thickness Lm of a θ magnet to the outside diameter Dr of a rotor core for which Bg/Br>1.0.

FIG. 11 is a graph showing a relation between the number P of magnetic poles and the ratio (Lm/Dr) of the thickness Lm of a θ magnet to the maximum outside diameter Dr of a rotor core for which Bg/Br>1.0. That is, FIG. 11 shows an upper limit and a lower limit in the range of Lm/Dr for which Bg/Br>1.0 in a convex curve of FIG. 10 for each of the number P of magnetic poles. Also, a maximum value is a value of Lm/Dr for which the value of Bg/Br for each of the number of magnetic poles assumes the maximum (peak) value.

Thus, the number P of magnetic poles and the ratio (Lm/Dr) of the thickness Lm of the θ magnet to the maximum outside diameter Dr of the rotor core are selected so as to lie between a curve connecting the upper limits (triangular points) of FIG. 11 and a curve connecting the lower limits (square points) of FIG. 11. As a result, the average magnetic flux density in the outer circumferential part of the rotor of the motor can be raised.

More specifically, approximation formulae for a curve connecting the upper limits and a curve connecting the lower limits are calculated where the number of magnetic poles is denoted by P, the maximum outside diameter of the rotor core is denoted by Dr [mm] and the thickness of the θ magnets in the circumferential direction of the rotor core is denoted by Lm [mm]. As a result, the number of θ magnets 28 and the shape thereof may be preferably so determined and constructed as to satisfy the following inequalities, for instance:

$$0.665 \times 10^{-4} \times P^2 - 0.28 \times 10^{-2} \times P + 0.577 \times 10^{-1} < (Lm/Dr)$$
$$< 3.38 \times 10^{-4} \times P^2 - 1.86 \times 10^{-2} \times P + 3.36 \times 10^{-1}$$

In consideration of the maximum value of Bg/Br in each of the number of magnetic poles shown in FIG. 10, the number P of magnetic poles of the rotor may be any one of 12 poles, 14 poles, 16 poles, 18 poles and 20 poles. If such a number of magnetic poles is used, the average magnetic flux density Bg in the outer circumferential part of the rotor 12 can be increased at least about 1.3 times the residual magnetic flux density Br of the θ magnet 28.

Here, the maximum outside diameter of the rotor core 26 (the rotor 12) may be 35 mm to 200 mm, for instance. Also, the diameter of the through-hole 26a of the rotor core 26, namely the diameter of the rotating shaft 24, may be 5 mm to 40 mm, for instance. Also, if the θ magnet 28 is an approximately rectangular parallelepiped, the size of the θ magnet 28 may be set, for instance, such that the thickness thereof in the circumferential directions θ of the rotor core 26 is 1 mm to 25 mm, the width thereof in the radial direction r of the rotor core 26 is 5 mm to 80 mm, and the length thereof in a direction of the rotating shaft of the rotor is 8 mm to 32 mm. Also, the thickness of a single electromagnetic steel sheet forming the rotor core 26 may be 0.2 mm to 1.0 mm, for instance. Also, the magnetic property of the θ magnet 28 may be such that the residual magnetic flux density Br is 0.4 T to 1.5 T, for instance, and a holding force Hcb is 320 kA/m to 1200 kA/m, for instance.

Second Embodiment

Figure 12A:
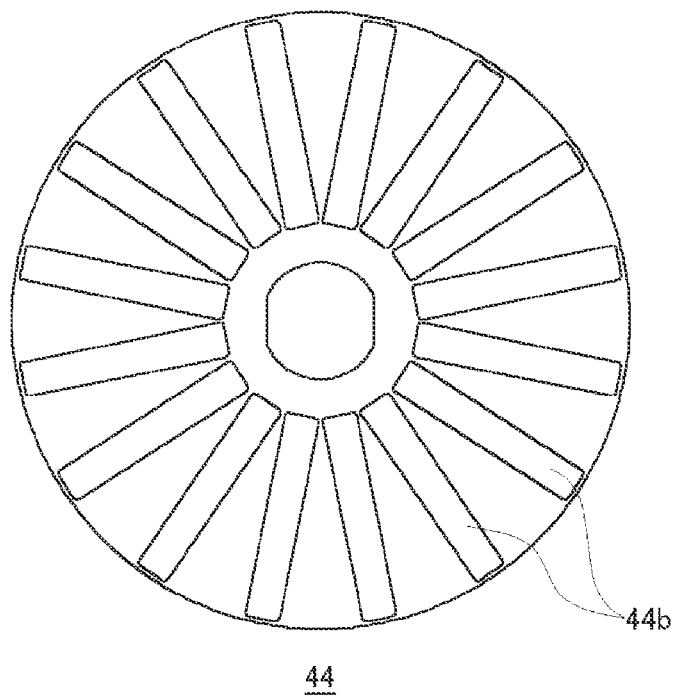
FIG. 12A is a top view of a rotor core, according to a second embodiment, without having the relief parts.
Figure 12B:
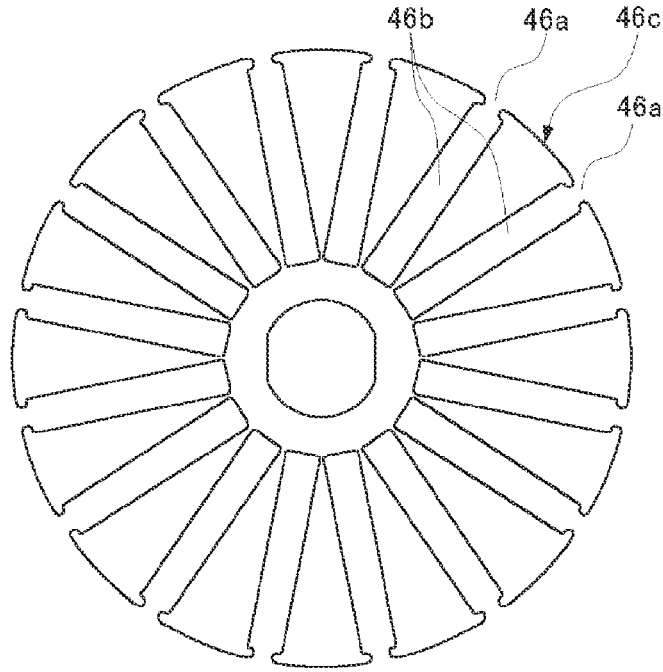
FIG. 12B is a top view of a rotor core, according to the second embodiment, wherein no relief parts is provided and the outer periphery is disconnected.

A modification of the rotor core will be described in each of the following embodiments. FIG. 12A is a top view of a rotor core, according to a second embodiment, without having the relief parts. FIG. 12B is a top view of a rotor core, according to the second embodiment, wherein no relief parts is provided and the outer periphery is disconnected.

Similar to the rotor core 26 of the first embodiment, a rotor core 44 shown in FIG. 12A has a plurality of magnet holding sections 44b that are fixed by inserting the θ magnets thereinto. Unlike the rotor core 26 of the first embodiment, the magnet holding section 44b does not have the relief parts.

Accordingly, there is no need to take into account the interference, between the circumferential relief parts 34a, as with the rotor core 26 both in the radial direction of the rotor core in the magnet holding section 44b and in the center-side of the rotor core in the magnet holding section 44b. Thus, the magnet holding section 44b can be extended toward the radial direction of the rotor core. In other words, the θ magnet 28 whose length in the radial direction of the rotor core is larger can be received and held, so that the valid magnetic fluxes in a principal surface of a θ magnet 28 (i.e., a surface having a magnetic pole) can be raised (namely, the torque can be raised). Also, since no relief parts is provided, no hollow spaces will be created on a principal surface side of the θ magnet 28 held by the magnet holding section 44b. Hence, a reduction in the valid magnetic fluxes heading toward the outer circumferential part of the rotor core 26 is avoided.

For the magnet holding section 44b having no relief parts, the operability when the θ magnets 28 are to be inserted into the magnet holding sections 44b can be improved if the θ magnets 28 having C faces and R faces in the corners are used. In such a case, the bonded magnets where C faces and R faces can be formed in the corners during the molding without the preprocessing may preferably be used for the θ magnets 28. However, the sintered magnets may be used for the θ magnets 28 if the C faces and R faces can be formed in the corners.

The rotor core 46 shown in FIG. 12B has a plurality of magnet holding sections 46b. Although, unlike the rotor core 26 according to the first embodiment, the magnet holding section 46b has no relief parts, the magnet holding section 46b has cut sections 46a on an outer circumference surface 46c in a radial direction of the rotor core. Hence, the occurrence of magnetic short-circuiting in an outer circumferential part of the rotor core 46 is suppressed.

Third Embodiment

Figure 13A:
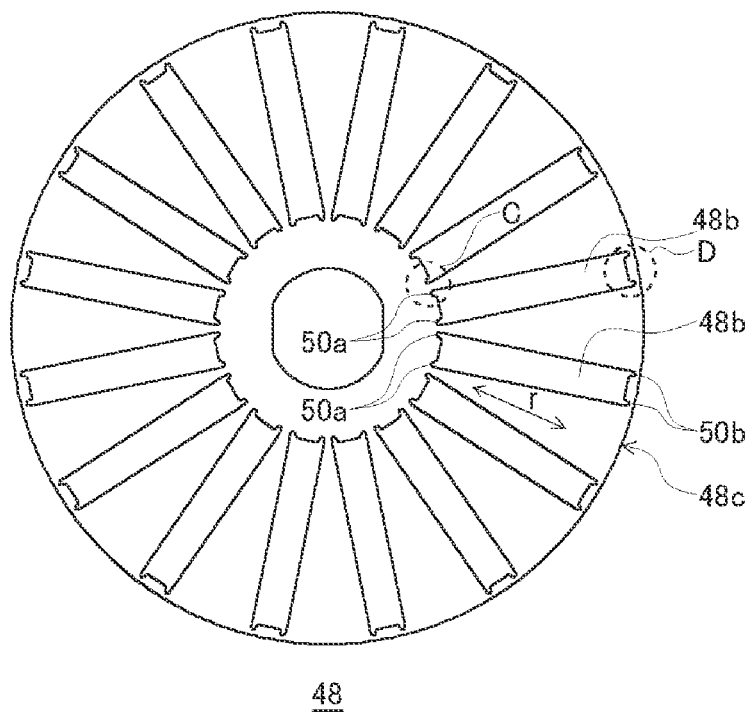
FIG. 13A is a top view of a rotor core according to a third embodiment.
Figure 13B:
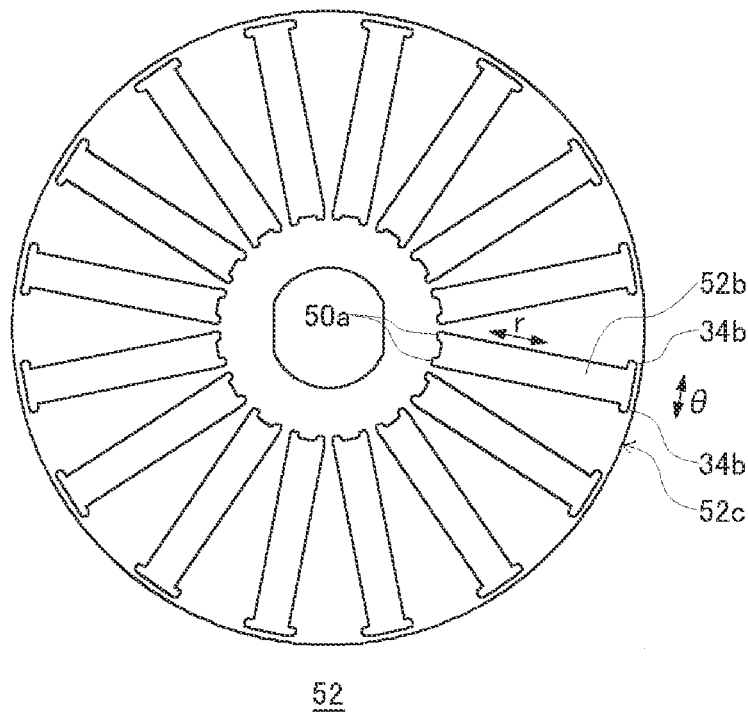
FIG. 13B is a top view of a rotor core according to a modification of the third embodiment.
Figure 14A:
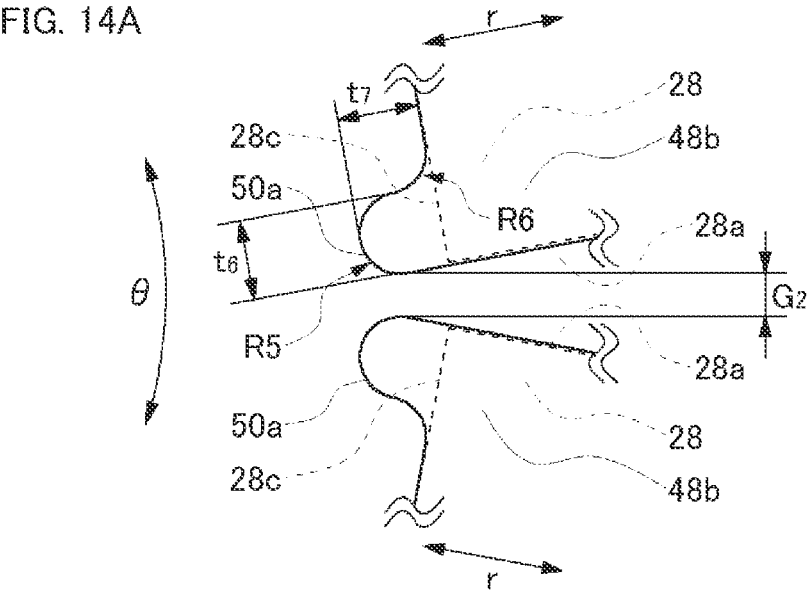
FIG. 14A is an enlarged view of region C in FIG. 13A.
Figure 14B:
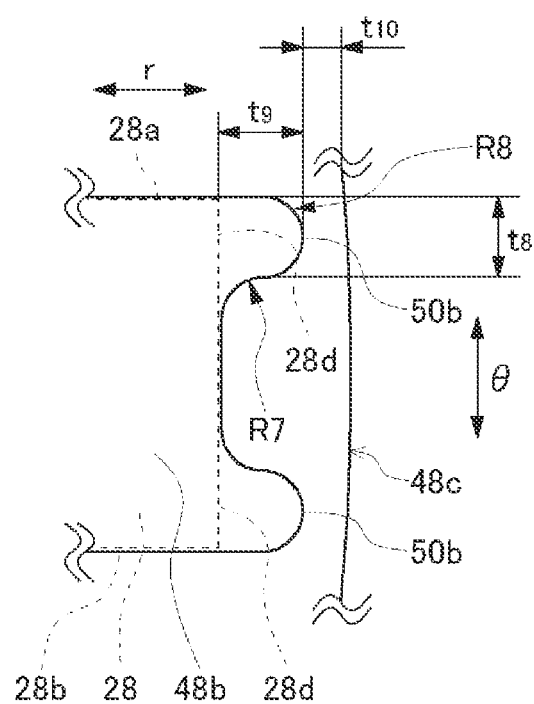
FIG. 14B is an enlarged view of region D in FIG. 13A.

FIG. 13A is a top view of a rotor core according to a third embodiment. FIG. 13B is a top view of a rotor core according to a modification of the third embodiment. FIG. 14A is an enlarged view of region C in FIG. 13A. FIG. 14B is an enlarged view of region D in FIG. 13A.

A rotor core 48 shown in FIG. 13A has a plurality of magnet holding sections 48b formed radially. The magnet holding section 48b has radial relief parts 50a formed in a radial direction r of the rotor core 48 and in a center-side end of the rotor core 48. Here, the radial relief parts 50a form gaps when the θ magnet 28 is contained in and held by the magnet holding section 48b. The radial relief part 50a is coplanar with a principal surface 28a (28b) having a magnetic pole of the θ magnet 28 contained in the magnet holding section 48b. Also, the radial relief parts 50a are provided such that they extend toward the center of the rotor core 48 from a center-side end face 28c of the rotor core of the θ magnet 28 contained in the magnet holding section 48b.

Given that the thickness of a single electromagnetic steel sheet that constitutes the rotor core 48 is denoted by T [mm], the dimensions of the radial relief part 50a are so set as to satisfy the following inequalities. That is, the thickness $t_6$ of the radial relief part 50a in the circumferential directions θ is set such that $t_6 \leq 3T$ and more preferably $t_6 \leq 2T$, and the thickness $t_7$ thereof in the radial direction r is set such that $t_7 \leq 3T$ and more preferably $t_7 \leq 2T$. Also, the diameters of an R5 face and an R6 face of the radial relief part 50a are each less than or equal to 1.5 T and more preferably less than or equal to 1.0 T. Also, an interval G2 between adjacent radial relief parts 50a is about 1.0 T.

Also, the magnet holding section 48b has radial relief parts 50b formed in the radial direction r of the rotor core 48 and in an end opposite to the center side of the rotor core 48. Here, the radial relief parts 50b form gaps when the θ magnet 28 is contained in and held by the magnet holding section 48b. The radial relief parts 50b are coplanar with the principal surfaces 28a and 28b having the magnetic poles of the θ magnet 28 contained in the magnet holding section 48b. Also, the radial relief parts 50b are provided such that they extend toward an outer circumferential surface 48c of the rotor core 48 from an end face 28d opposite to the center side of the rotor core of the θ magnet 28 contained in the magnet holding section 48b.

The dimensions of the radial relief part 50b are so set as to satisfy the following inequalities. That is, the thickness $t_8$ of the radial relief part 50b in the circumferential directions θ is set such that $t_8 \leq 3T$ and more preferably $t_8 \leq 2T$, and the thickness $t_9$ thereof in the radial direction r is set such that $t_9 \leq 3T$ and more preferably $t_9 \leq 2T$. Also, the diameters of an R7 face and an R8 face of the radial relief part 50b are each less than or equal to 1.5 T and more preferably less than or equal to 1.0 T. The thickness $t_{10}$ between the radial relief part 50b and the outer circumferential surface 48c of the rotor core 48 is about 1.0 T.

Since the magnet holding section 48b has the radial relief parts 50a and the radial relief parts 50b, the interference of corners (edge portions) of the θ magnet 28 with the magnet holding section 48b, which may otherwise occur when the θ magnets 28 are inserted to the rotor core 48, is suppressed. Accordingly, the degree of freedom in the shape of the θ magnets 28, particularly the shape of the corners, increases, thereby improving the operability when the θ magnets 28 are to be inserted into the magnet holding sections 48b even though the θ magnets 28 have no R faces or C faces. Also, invalid magnetic fluxes, heading toward the opposite principal surface 28b passing through within the rotor core 48, among the fluxes emanating from the principal surface 28a of each θ magnet 28 are blocked by the radial relief parts 50a and 50b, which are filled with air whose relative magnetic permeability is low. Hence, the occurrence of short-circuiting (magnetic short-circuiting) inside the rotor core 48 is suppressed.

At the same time, because of the radial relief parts 50a and 50b, it is possible that valid magnetic fluxes, which leave the principal surface 28a of the θ magnet 28 and then enter the principal surface 28b by way of the gap, will be reduced. However, a sintered magnet having a high residual magnetic flux density can be used as the θ magnet 28 even though the magnet does not have the C face (inclined plane) or R face in the corner. Thus, a desired average magnetic flux density for the rotor can be achieved.

For the rotor core 48, there is no need to take into account the interference, between the circumferential relief parts 34a, as with the rotor core 26 both in the radial direction of the rotor core 48 in the magnet holding section 48b and in the center-side of the rotor core in the magnet holding section 48b. Thus, the magnet holding section 48b can be extended toward the radial direction of the rotor core. In other words, the θ magnet 28 whose length in the radial direction of the rotor core is larger can be received and held, so that the valid magnetic fluxes in a principal surface of a θ magnet 28 (i.e., a surface having a magnetic pole) can be raised (namely, the torque can be raised). Also, since no circumferential relief parts is provided, no hollow spaces will be created on a principal surface side of the θ magnet 28 held by the magnet holding section 48b. Hence, a reduction in the valid magnetic fluxes heading toward the outer circumferential part of the rotor core 48 is avoided.

A rotor core 52 shown in FIG. 13B is a modification of the rotor core 48 shown in FIG. 13A. The rotor core 52 has a plurality of magnet holding sections 52b formed radially. The magnet holding section 52b has the radial relief parts 50a formed in the radial direction r of the rotor core 52 and in a center-side end of the rotor core 52. Here, the radial relief parts 50a form gaps when the θ magnet 28 is contained in and held by the magnet holding section 52b.

Also, similar to the rotor core 26, the magnet holding section 52b has the circumferential relief parts 34b formed in the radial direction r of the rotor core 52 and in an end opposite to the center side of the rotor core 52. Here, the circumferential relief parts 34b form gaps when the θ magnet 28 is contained in and held by the magnet holding section 52b. The operation performed by and the effects achieved by the rotor core 52 are similar to those described in each of the above-described embodiments and therefore the repeated description thereof is omitted here.

Fourth Embodiment

Figure 15A:
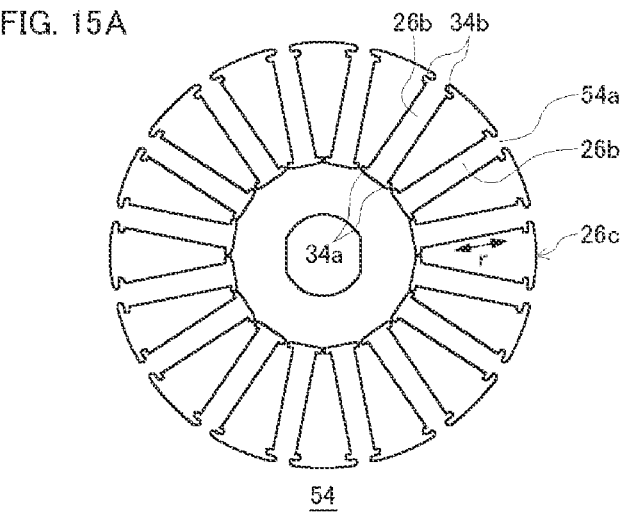
FIG. 15A to FIG. 15C are top views of exemplary rotor cores according to a fourth embodiment.
Figure 15B:
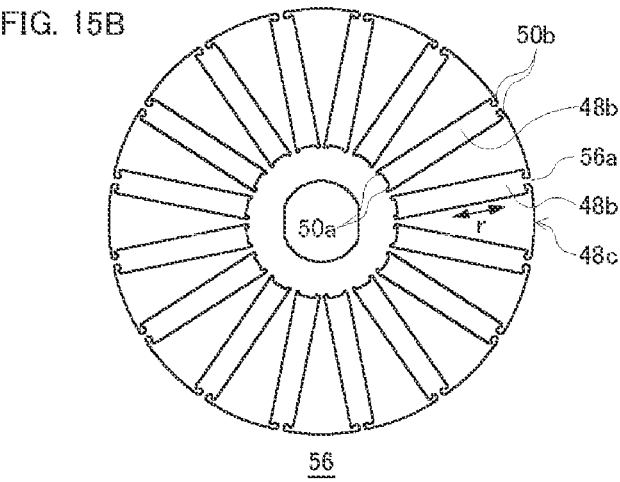
Figure 15C:
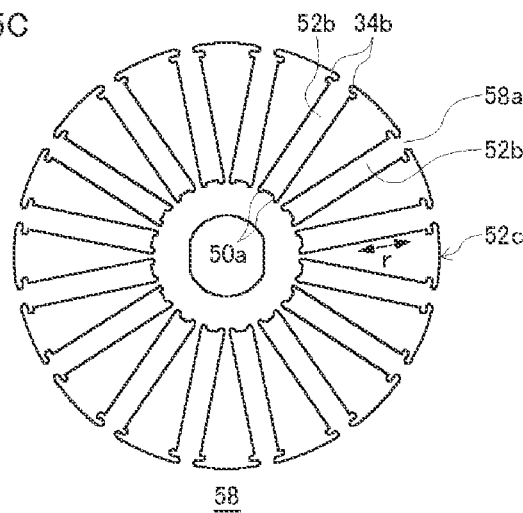

FIG. 15A to FIG. 15C are top views of exemplary rotor cores according to a fourth embodiment.

A rotor core 54 shown in FIG. 15A is one in which a part of the outer circumferential surface 26c of the rotor core 26 according to the first embodiment is disconnected or disjoint. As a result, a cut section 54a, which communicates with the exterior, is formed at an outer end of the magnet holding section 26b in radial directions r of the rotor core.

A rotor core 56 shown in FIG. 15B is one in which a part of the outer circumferential surface 48c of the rotor core 48 according to the third embodiment is disconnected or disjoint. As a result, a cut section 56a, which communicates with the exterior, is formed at an outer end of the magnet holding section 48b in radial directions r of the rotor core.

A rotor core 58 shown in FIG. 15C is one in which a part of an outer circumferential surface 52c of the rotor core 52 according to the modification of the third embodiment is disconnected or disjoint. As a result, a cut section 58a, which communicates with the exterior, is formed at an outer end of the magnet holding section 52b in radial directions r of the rotor core.

As described above, the occurrence of magnetic short-circuiting near the outer circumferential surface of each of the rotor cores 54, 56 and 58 that cut sections are formed on an outer circumference surface is suppressed. This increases the valid magnetic fluxes directed outward from the outer circumferential surface of the rotor core.

The motor according to the above-described embodiments is comprised of a cylindrical stator, where a plurality of winding wires are placed, the above-described rotor provided in the center of the stator, and a power feed section that supplies power to the plurality of winding wires of the stator.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

A description is given hereunder of a modification of the relief parts in each of the above-described embodiments.

Figure 16A:
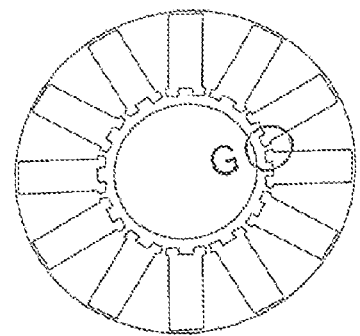
FIG. 16A is a top view of a rotor core according to an example of a first modification.
Figure 16B:
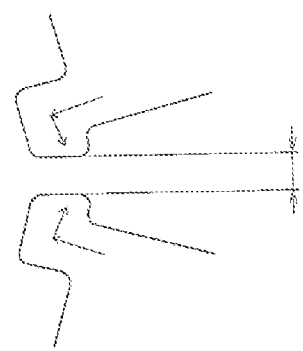
FIG. 16B is an enlarged view of region G in FIG. 16A.

FIG. 16A is a top view of a rotor core according to an example of a first modification. FIG. 16B is an enlarged view of region G in FIG. 16A. A rotor core 110 shown in FIG. 16A is configured such that radial relief parts are formed in the center-side end of the rotor core 110 and such that circumferential relief parts are further formed from the radial relief parts.

FIG. 17A to FIG. 17H are top views of rotor cores according to other examples of the first modification.

Figure 17A:
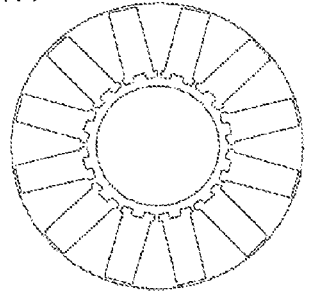
FIG. 17A to FIG. 17H are top views of rotor cores according to other examples of the first modification.
Figure 17E:
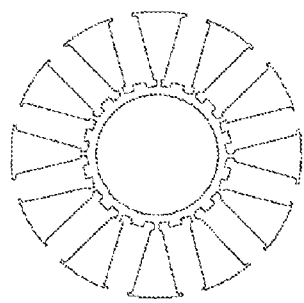
Figure 17B:
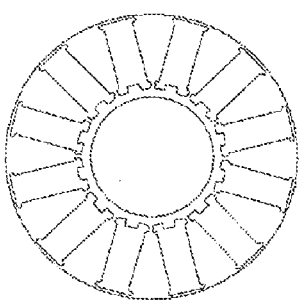
Figure 17F:
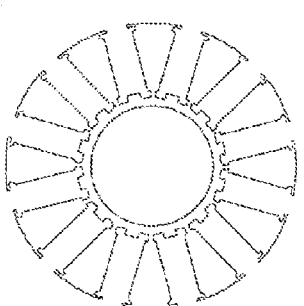
Figure 17C:
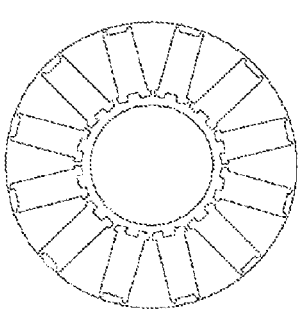
Figure 17G:
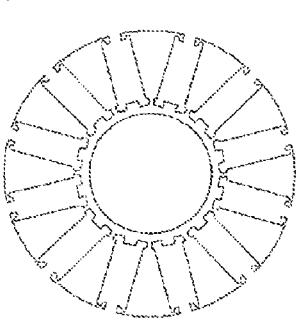
Figure 17D:
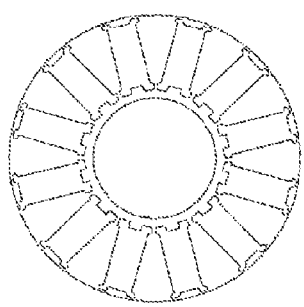
Figure 17H:
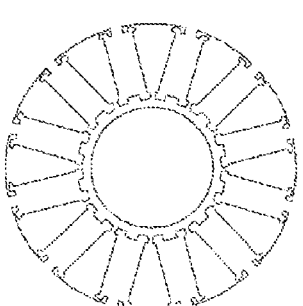

A rotor core shown in FIG. 17A is configured such that the periphery of the rotor core is not separated and such that no relief parts is formed in an end opposite to the center side of the rotor core. A rotor core shown in FIG. 17B is configured such that the periphery of the rotor core is not separated and such that the circumferential relief parts are formed in the end opposite to the center side of the rotor core. A rotor core shown in FIG. 17C is configured such that the periphery of the rotor core is not separated and such that the radial relief parts are formed in the end opposite to the center side of the rotor core. A rotor core shown in FIG. 17D is configured such that the periphery of the rotor core is not separated and such that the circumferential relief parts and the radial relief parts are formed in the end opposite to the center side of the rotor core. A rotor core shown in FIG. 17E is configured such that the periphery of the rotor core is separated and such that no relief parts is formed in an end opposite to the center side of the rotor core. A rotor core shown in FIG. 17F is configured such that the periphery of the rotor core is separated and such that the circumferential relief parts are formed in the end opposite to the center side of the rotor core. A rotor core shown in FIG. 17G is configured such that the periphery of the rotor core is separated and such that the radial relief parts are formed in the end opposite to the center side of the rotor core. A rotor core shown in FIG. 17H is configured such that the periphery of the rotor core is separated and such that the circumferential relief parts and the radial relief parts are formed in the end opposite to the center side of the rotor core.

Figure 18A:
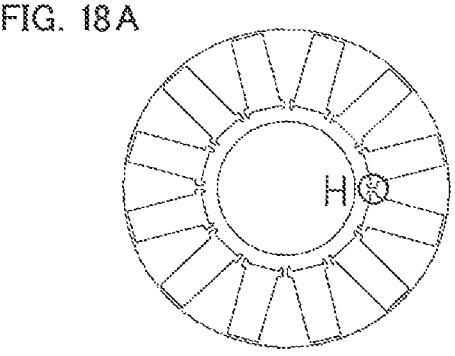
FIG. 18A is a top view of a rotor core according to an example of a second modification.
Figure 18B:
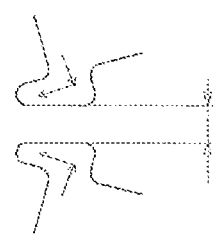
FIG. 18B is an enlarged view of region H in FIG. 18A.

FIG. 18A is a top view of a rotor core according to an example of a second modification. FIG. 18B is an enlarged view of region H in FIG. 18A. A rotor core 120 shown in FIG. 18A is configured such that circumferential relief parts are formed in the center-side end of the rotor core 120 and such that radial relief parts are further formed from the circumferential relief parts.

FIG. 19A to FIG. 19H are top views of rotor cores according to other examples of the second modification.

Figure 19A:
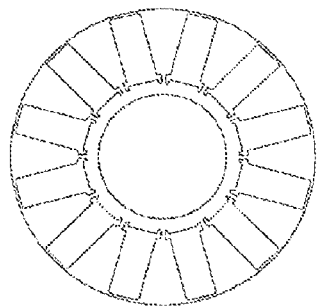
FIG. 19A to FIG. 19H are top views of rotor cores according to other examples of the second modification.

A rotor core shown in FIG. 19A is configured such that the periphery of the rotor core is not separated and such that no relief parts is formed in an end opposite to the center side of the rotor core. A rotor core shown in FIG. 19B is configured such that the periphery of the rotor core is not separated and such that the circumferential relief parts are formed in the end opposite to the center side of the rotor core. A rotor core shown in FIG. 19C is configured such that the periphery of the rotor core is not separated and such that the radial relief parts are formed in the end opposite to the center side of the rotor core. A rotor core shown in FIG. 19D is configured such that the periphery of the rotor core is not separated and such that the circumferential relief parts and the radial relief parts and are formed in the end opposite to the center side of the rotor core.

Figure 19E:
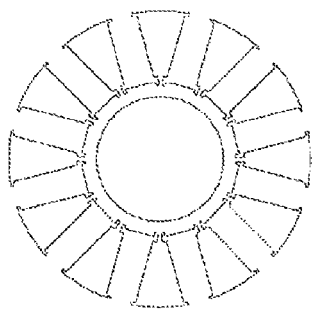
Figure 19B:
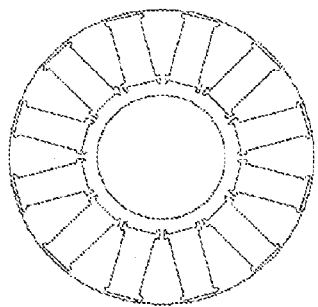
Figure 19F:
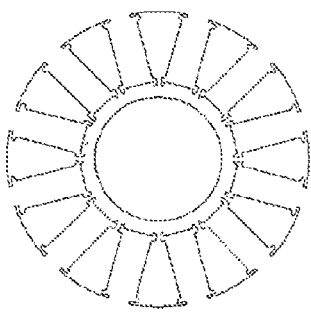
Figure 19C:
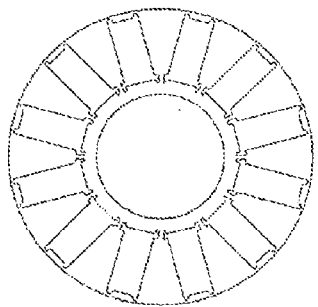
Figure 19G:
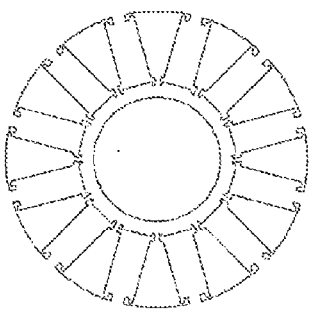
Figure 19D:
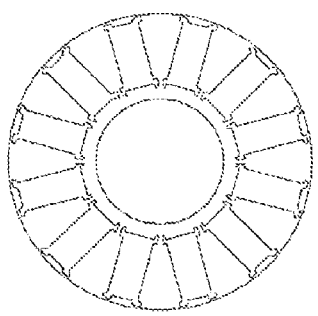
Figure 19H:
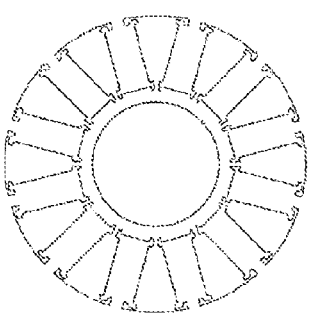

A rotor core shown in FIG. 19E is configured such that the periphery of the rotor core is separated and such that no relief parts is formed in an end opposite to the center side of the rotor core. A rotor core shown in FIG. 19F is configured such that the periphery of the rotor core is separated and such that the circumferential relief parts are formed in the end opposite to the center side of the rotor core. A rotor core shown in FIG. 19G is configured such that the periphery of the rotor core is separated and such that the radial relief parts are formed in the end opposite to the center side of the rotor core. A rotor core shown in FIG. 19H is configured such that the periphery of the rotor core is separated and such that the circumferential relief parts and the radial relief parts are formed in the end opposite to the center side of the rotor core.

Figure 20A:
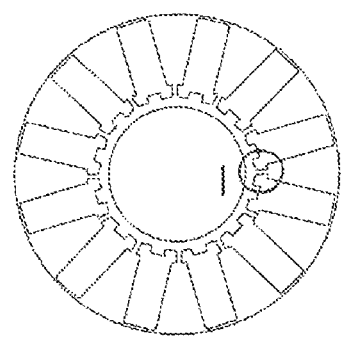
FIG. 20A is a top view of a rotor core according to an example of a third modification.
Figure 20B:
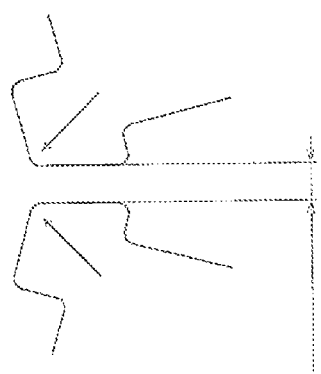
FIG. 20B is an enlarged view of region I in FIG. 20A.

FIG. 20A is a top view of a rotor core according to an example of a third modification. FIG. 20B is an enlarged view of region I in FIG. 20A. A rotor core 130 shown in FIG. 20A is configured such that circumferential relief parts are formed in the center-side end of the rotor core 130 and such that radial relief parts are further formed from the circumferential relief parts.

FIG. 21A to FIG. 21H are top views of rotor cores according to other examples of the third modification.

Figure 21A:
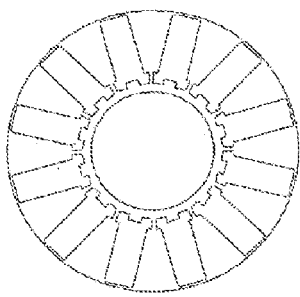
FIG. 21A to FIG. 21H are top views of rotor cores according to other examples of the third modification.
Figure 21B:
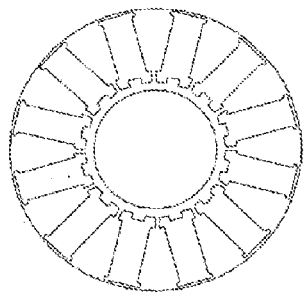
Figure 21C:
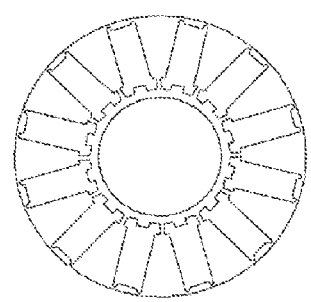
Figure 21D:
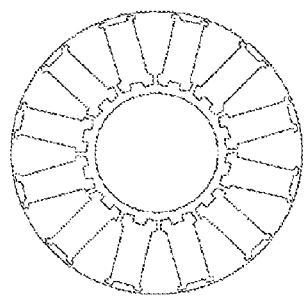

A rotor core shown in FIG. 21A is configured such that the periphery of the rotor core is not separated and such that no relief parts is formed in an end opposite to the center side of the rotor core. A rotor core shown in FIG. 21B is configured such that the periphery of the rotor core is not separated and such that the circumferential relief parts are formed in the end opposite to the center side of the rotor core. A rotor core shown in FIG. 21C is configured such that the periphery of the rotor core is not separated and such that the radial relief parts are formed in the end opposite to the center side of the rotor core. A rotor core shown in FIG. 21D is configured such that the periphery of the rotor core is not separated and such that the circumferential relief parts and the radial relief parts and are formed in the end opposite to the center side of the rotor core.

Figure 21E:
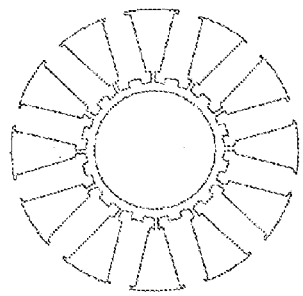
Figure 21F:
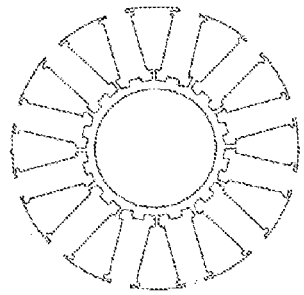
Figure 21G:
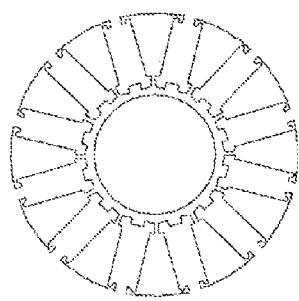
Figure 21H:
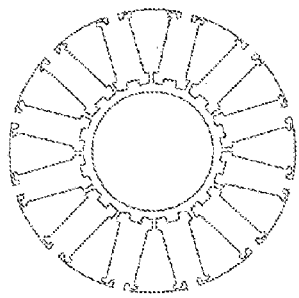

A rotor core shown in FIG. 21E is configured such that the periphery of the rotor core is separated and such that no relief parts is formed in an end opposite to the center side of the rotor core. A rotor core shown in FIG. 21F is configured such that the periphery of the rotor core is separated and such that the circumferential relief parts are formed in the end opposite to the center side of the rotor core. A rotor core shown in FIG. 21G is configured such that the periphery of the rotor core is separated and such that the radial relief parts are formed in the end opposite to the center side of the rotor core. A rotor core shown in FIG. 21H is configured such that the periphery of the rotor core is separated and such that the circumferential relief parts and the radial relief parts are formed in the end opposite to the center side of the rotor core.

Figure 22A:
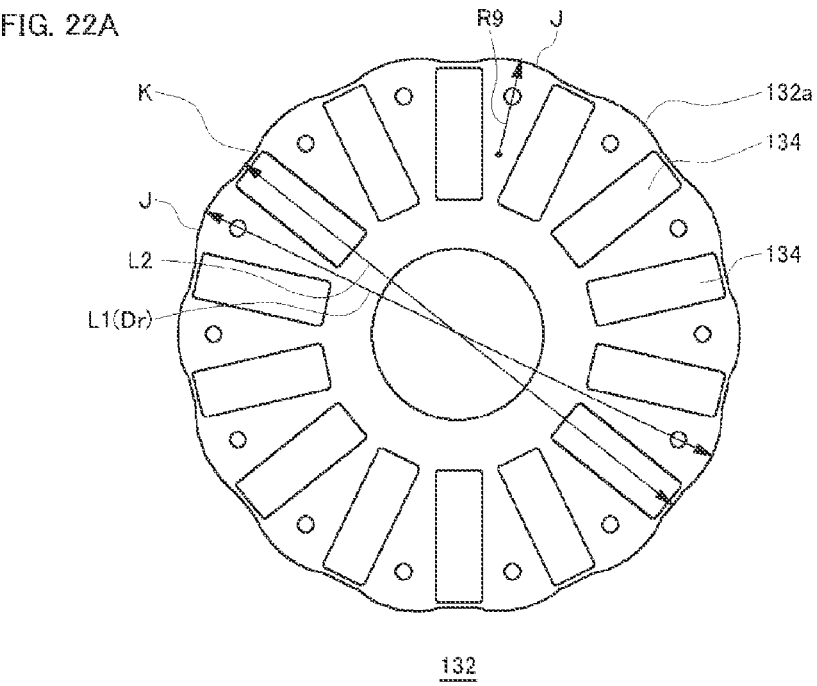
FIGS. 22A and 22B are top views of a rotor core according to an example of a fourth modification.
Figure 22B:
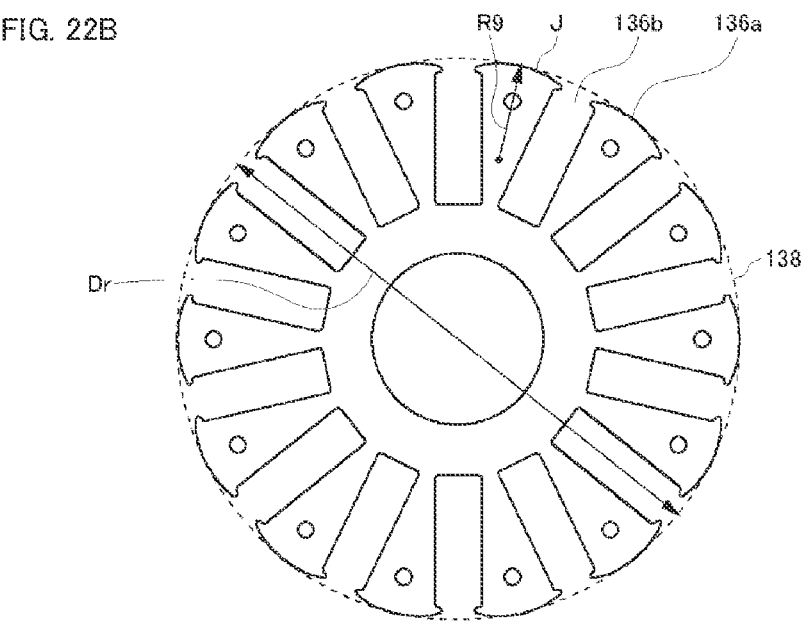

FIGS. 22A and 22B are top views of a rotor core according to an example of a fourth modification. The rotor core shown in FIGS. 22A and 22B is configured such that the number of magnetic poles of the rotor is 14 and is used in combination with a stator having 12 grooves.

Like the rotor core 44 shown in FIG. 12A, a rotor core 132 shown in FIG. 22A has a plurality of magnet holding sections 134 that are fixed by inserting the θ magnets thereinto. Unlike the rotor core 26 according to the first embodiment, the magnet holding section 134 has no relief parts. Unlike the rotor cores described above, the diameter L of the rotor core 132 is not constant. In other words, region J (diameter L1) having the largest diameter and region K (diameter L2) having the smallest diameter are periodically formed on an outer circumferential surface 132a of the rotor core 132. Region J has a curved surface defined by a radius of curvature R9 shorter than a radius L/2. The maximum outside diameter Dr described above is equal to the diameter L1. By using the rotor core 132 as described above, cogging or torque ripple in the motor can be suppressed.

A rotor core 136 shown in FIG. 22B differs from the rotor core 132 shown in FIG. 22A in that cut sections 136b are formed on an outer circumference surface 136a in a radial direction of the rotor core. Hence, the occurrence of magnetic short-circuiting in an outer circumferential part of the rotor core 136 is suppressed. The maximum outside diameter Dr mentioned above may be defined as the diameter of a virtual circle 138 connecting the vertices of region J (diameter L1) where the diameter is at maximum.

Figure 23A:
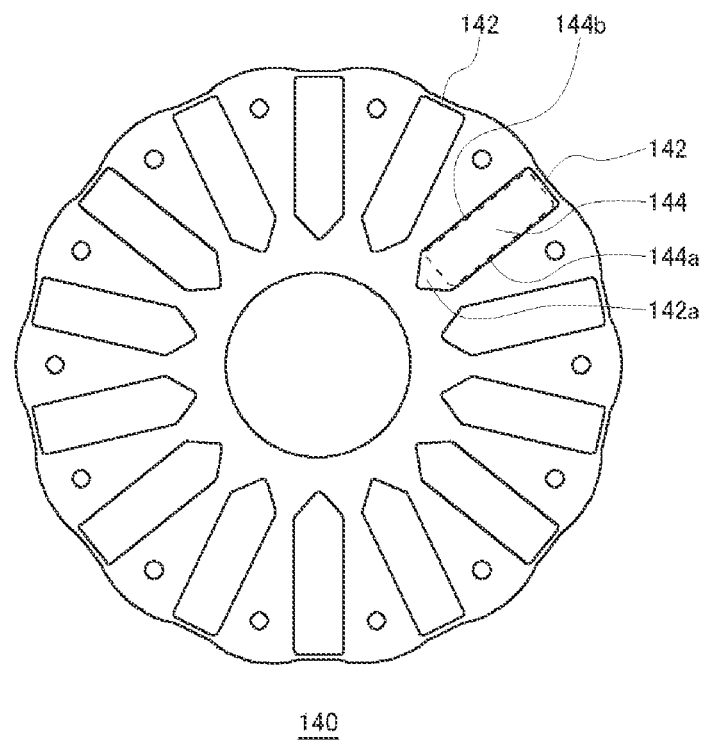
FIGS. 23A and 23B are top views of a rotor core according to an example of a fifth modification.
Figure 23B:
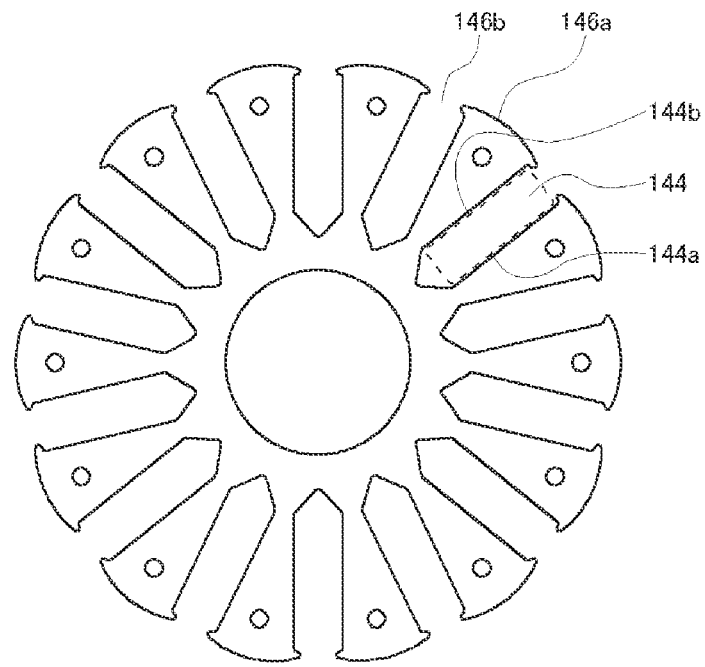

FIGS. 23A and 23B are top views of a rotor core according to an example of a fifth modification. A rotor core 140 shown in FIG. 23A differs from the rotor core 132 shown in FIG. 22A in the shape of magnet holding sections 142. More specifically, relief parts 142a having a triangular prism shape are formed in the magnet holding sections 142. The relief parts 142a form gaps when a θ magnet 144 is contained in and held by the magnet holding section 142. Invalid magnetic fluxes, heading toward an opposite principal surface 144b passing through within the rotor core 140, among the fluxes emanating from a principal surface 144a of each θ magnet 144 are blocked by the relief parts 142a, which are filled with air whose relative magnetic permeability is low. Hence, the occurrence of short-circuiting (magnetic short-circuiting) inside the rotor core 140 is suppressed.

A rotor core 146 shown in FIG. 23B differs from the rotor core 140 shown in FIG. 23A in that cut sections 146b are formed on an outer circumference surface 146a in a radial direction of the rotor core. Hence, the occurrence of magnetic short-circuiting in an inner circumferential part and outer circumferential part of the rotor core 146 is suppressed.

Figure 24A:
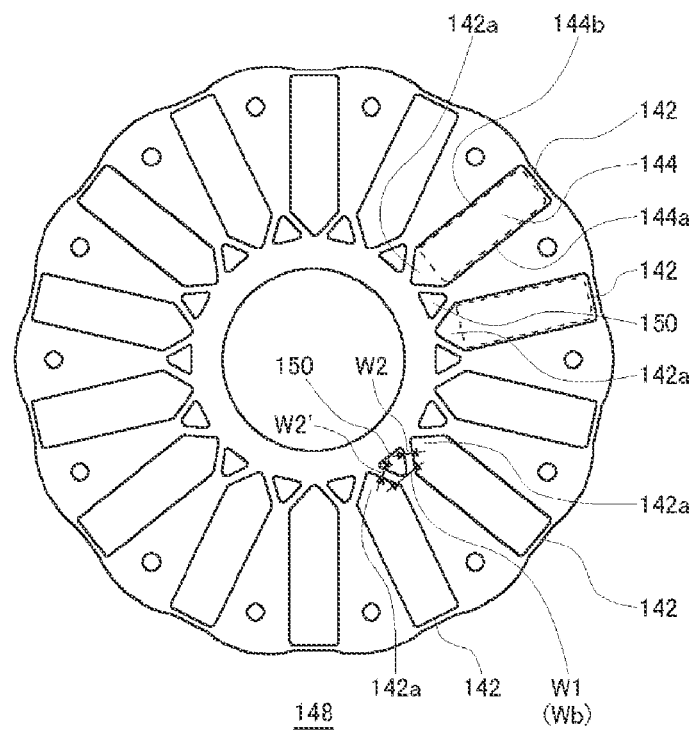
FIGS. 24A and 24B are top views of a rotor core according to an example of a sixth modification.
Figure 24B:
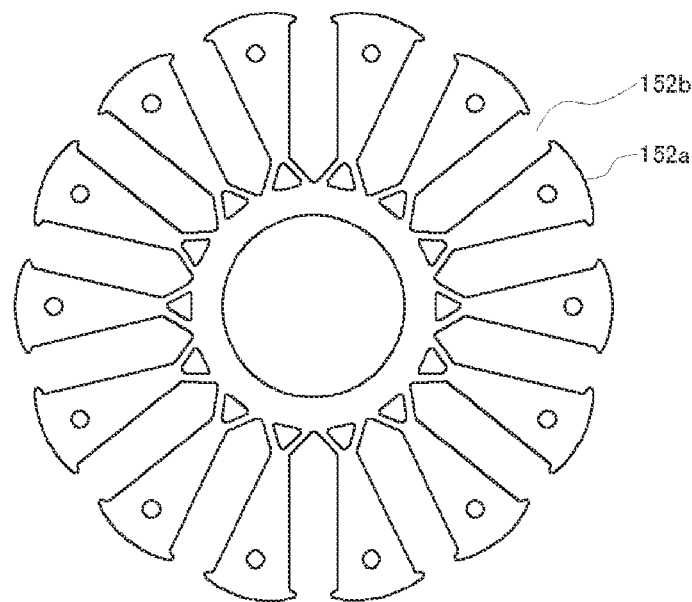

FIGS. 24A and 24B are top views of a rotor core according to an example of a sixth modification. A rotor core 148 shown in FIG. 24A significantly differs from the rotor core 140 shown in FIG. 23A in that through holes 150 having a triangular prism shape are formed between the relief parts 142a of the adjacent magnet holding sections 142. Due to the through holes 150, it is ensured that a sum of the minimum width W2 and the minimum width W2' of the two bridges respectively formed between the relief parts 142a and the through hole 150 is smaller than the minimum width W1 (Wb) between the magnet holding sections 142 (W2+W2'<W1).

As a result, the magnetic flux emanating from the principal surface 144a of each θ magnet 144 are less likely to be directed toward the opposite principal surface 144b due to an extremely narrow region between the magnet holding section 142 and the through hole 150 in the rotor core 148. Hence, the occurrence of short-circuiting (magnetic short-circuiting) inside the rotor core 148 is suppressed. By ensuring that the width of the respective parts is such that W1≈W2+W2', the strength of the rotor core 148 itself is prevented from being seriously reduced. By ensuring that W2≈W2', it is ensured that the motor characteristics remain unchanged regardless of whether the rotor core 148 is normally rotated or reversely rotated.

A rotor core 152 shown in FIG. 24B differs from the rotor core 148 shown in FIG. 24A in that cut sections 152b are formed on an outer circumference surface 152a in a radial direction of the rotor core. Hence, the occurrence of magnetic short-circuiting in an inner circumferential part and outer circumferential part of the rotor core 152 is suppressed.

The invention claimed is:
1. A rotor comprising:
   a circular rotor core; and
   a plurality of plate-like magnets,
   wherein the rotor core has a plurality of magnet holding sections formed radially around a rotating shaft,
   wherein the plate-like magnets are contained in the magnet holding sections such that the same magnetic pole of one magnet as that of another magnet adjacent to said one magnet faces the same magnet pole of the adjacent magnet in circumferential directions of the rotor core, and
   wherein, given that the number of magnetic poles of the rotor is denoted by P, the maximum outside diameter of the rotor core is denoted by Dr [mm], and the thickness of the plate-like magnet in a circumferential direction of the rotor core is denoted by Lm [mm], the following inequality (2) is satisfied:

$$0.665 \times 10^{-4} \times P^2 - 0.28 \times 10^{-2} \times P + 0.577 \times 10^{-1} < (Lm/Dr) < 3.38 \times 10^{-4} \times P^2 - 1.86 \times 10^{-2} \times P + 3.36 \times 10^{-1} \quad (2).$$

2. The rotor according to claim 1,
   wherein, given that the surface area of a surface of the plate-like magnet having a magnetic pole is denoted by $S_1$ [mm$^2$], and the surface area of an outer circumferential surface of the rotor core is denoted by $S_2$ [mm$^2$], the following inequality (1) is satisfied:

$$S_1 > S_2/P \quad (1).$$

3. The rotor according to claim 1,
wherein the rotor core is a laminate of a plurality of electromagnetic steel sheets or cold-rolled steel sheets, and
wherein, given that the thickness of a single electromagnetic steel sheet or cold-rolled steel sheet is denoted by T [mm], and the shortest distance between the adjacent plate-like magnets is denoted by Wb [mm], the following inequality (3) is satisfied:

$$Wb \leq 5T \quad (3).$$

4. The rotor according to claim 1,
wherein the magnet holding section has radial relief parts formed in a radial direction of the rotor core and in a center-side end of the rotor core, the radial relief parts forming gaps when the plate-like magnet is contained in and held by the magnet holding section, and
wherein the radial relief parts are provided such that they extend toward the center of the rotor core from a center-side end face of the rotor core of the plate-like magnet contained in the magnet holding section.

5. The rotor according to claim 1,
wherein the magnet holding section has circumferential relief parts formed in a radial direction of the rotor core and in a center-side end of the rotor core, the circumferential relief parts forming gaps when the plate-like magnet is contained in and held by the magnet holding section, and
wherein the circumferential relief parts are provided such that they extend toward the circumferential directions of the rotor core from surfaces having magnetic poles of the plate-like magnet contained in the magnet holding section.

6. The rotor according to claim 1,
wherein the number P of magnetic poles of the rotor is any one of 12 poles, 14 poles, 16 poles, 18 poles and 20 poles.

7. The rotor according to claim 1,
wherein the thickness Lm of the plate-like magnet in the circumferential directions of the rotor core is 1 mm to 25 mm.

8. The rotor according to claim 1,
wherein the maximum outside diameter Dr of the rotor core is 35 mm to 200 mm.

9. A motor comprising:
a cylindrical stator where a plurality of winding wires are placed;
a rotor, according to claim 1, provided in a center of the stator; and
a power feed section configured to supply power to the plurality of winding wires of the stator.

* * * * *